US011657396B1

(12) United States Patent
Shahidzadeh et al.

(10) Patent No.: US 11,657,396 B1
(45) Date of Patent: *May 23, 2023

(54) SYSTEM AND METHOD FOR BLUETOOTH PROXIMITY ENFORCED AUTHENTICATION

(71) Applicant: SecureAuth Corporation, Irvine, CA (US)

(72) Inventors: Nahal Shahidzadeh, Portland, OR (US); Haitham Akkary, Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 17/734,224

(22) Filed: May 2, 2022

Related U.S. Application Data

(63) Continuation of application No. 16/798,428, filed on Feb. 24, 2020, now Pat. No. 11,321,712, which is a continuation of application No. 15/700,153, filed on Sep. 10, 2017, now Pat. No. 10,572,874, which is a continuation of application No. 14/672,098, filed on Mar. 28, 2015, now Pat. No. 10,325,259.

(60) Provisional application No. 61/972,245, filed on Mar. 29, 2014.

(51) Int. Cl.
*G06Q 20/40* (2012.01)
*H04L 9/40* (2022.01)
*H04W 12/68* (2021.01)
*H04W 12/06* (2021.01)

(52) U.S. Cl.
CPC ............ *G06Q 20/40* (2013.01); *H04L 63/08* (2013.01); *H04L 63/0807* (2013.01); *H04L 63/0861* (2013.01); *H04L 63/20* (2013.01); *H04W 12/06* (2013.01); *H04W 12/68* (2021.01)

(58) Field of Classification Search
None
See application file for complete search history.

(56) References Cited

U.S. PATENT DOCUMENTS

| 2,146,842 | A | 2/1939 | Niessen |
|---|---|---|---|
| 5,903,882 | A | 5/1999 | Ay |
| 6,100,885 | A | 8/2000 | Donnelly |

(Continued)

OTHER PUBLICATIONS

Khann, Turan. "Contextual Intelligence", Harvard Business Review, Sep. 2014.

(Continued)

*Primary Examiner* — Namrata Boveja
*Assistant Examiner* — Liz P Nguyen
(74) *Attorney, Agent, or Firm* — Roark IP

(57) ABSTRACT

A system and method for authorizing a Client Device requested access, the method comprising: forming a proximity enforced Bluetooth® binded communication link between the Client Device and a Level of Assurance (LOA) Provider; providing a login screen to a user entity at the Client Device from a Relying Party (RP) Services Application; receiving login information from the user entity; obtaining identity of the user entity on the LOA Provider using a biometric information of the user entity; sending the biometric information, a private key and contextual identifiers to an LOA Server; and identifying the user entity at the LOA Server using the biometric information, the private key and the contextual identifiers and the Client Device in determining whether to grant access to the RP Services Application.

20 Claims, 10 Drawing Sheets

(56) References Cited

U.S. PATENT DOCUMENTS

| | | |
|---|---|---|
| 6,636,721 B2 | 10/2003 | Threadgill |
| 6,850,497 B1 | 2/2005 | Sigler |
| 7,243,369 B2 | 7/2007 | Bhat |
| 7,260,734 B2 | 8/2007 | Dickinson |
| 7,395,435 B2 | 7/2008 | Benhammou |
| 7,584,152 B2 | 9/2009 | Gupta |
| 7,721,322 B2 | 5/2010 | Sastry |
| 7,962,419 B2 | 6/2011 | Gupta |
| 7,971,062 B1 | 6/2011 | Hughes |
| 8,127,142 B2 | 2/2012 | Cuppet |
| 8,127,982 B1 | 3/2012 | Casey |
| 8,205,249 B2 | 6/2012 | Meister |
| 8,261,089 B2 | 9/2012 | Cobos |
| 8,327,142 B2 | 12/2012 | Lund |
| 8,346,924 B1 | 1/2013 | Bucher |
| 8,423,476 B2 | 4/2013 | Bishop |
| 8,457,781 B2 | 6/2013 | Bailey |
| 8,510,797 B2 | 8/2013 | Kastun |
| 8,510,811 B2 | 8/2013 | Kuang |
| 8,510,816 B2 | 8/2013 | Quach |
| 8,516,542 B2 | 8/2013 | Lemer |
| 8,572,714 B2 | 10/2013 | Radhakrishnan |
| 8,612,357 B2 | 12/2013 | Phillips |
| 8,613,067 B2 | 12/2013 | Lambiase |
| 8,615,562 B1 | 12/2013 | Huang |
| 8,661,254 B1 | 2/2014 | Sama |
| 8,700,901 B2 | 4/2014 | Lund |
| 8,707,031 B2 | 4/2014 | Grajek |
| 8,756,661 B2 | 6/2014 | Levenberg |
| 8,769,651 B2 | 7/2014 | Grajek |
| 8,776,204 B2 | 7/2014 | Faynberg |
| 8,812,838 B2 | 8/2014 | Grajek |
| 8,831,677 B2 | 9/2014 | Villa-Real |
| 8,869,241 B2 | 10/2014 | Davis |
| 8,904,494 B2 | 12/2014 | Kindler |
| 9,077,758 B1 | 7/2015 | McGovern |
| 9,124,576 B2 | 9/2015 | Grajek |
| 9,288,195 B2 | 3/2016 | Lambiase |
| 9,338,155 B2 | 5/2016 | Quach |
| 9,369,457 B2 | 6/2016 | Grajek |
| 9,374,369 B2 | 6/2016 | Mahaffey |
| 9,391,779 B2 | 7/2016 | Bair |
| 9,419,951 B1 | 8/2016 | Feisher |
| 9,426,183 B2 | 8/2016 | Shahidzadeh |
| 9,444,824 B1 | 9/2016 | Balazs |
| 9,473,310 B2 | 10/2016 | Grajek |
| 9,510,320 B2 | 11/2016 | Reed |
| 9,613,257 B2 | 4/2017 | Phillips |
| 9,660,974 B2 | 5/2017 | Grajek |
| 9,736,145 B1 | 8/2017 | Hayes |
| 9,742,809 B1 | 8/2017 | Shahidzadeh |
| 9,756,035 B2 | 9/2017 | Grajek |
| 9,769,209 B1 | 9/2017 | Graham |
| 9,781,097 B2 | 10/2017 | Grajek |
| 9,882,728 B2 | 1/2018 | Grajek |
| 9,900,163 B2 | 2/2018 | Lund |
| 9,930,040 B2 | 3/2018 | Quach |
| 10,148,699 B1 | 12/2018 | Shahidzadeh |
| 10,325,259 B1 | 6/2019 | Shahidzadeh |
| 10,387,980 B1 | 8/2019 | Shahidzadeh |
| 10,404,678 B2 | 9/2019 | Grajek |
| 10,419,418 B2 | 9/2019 | Grajek |
| 10,439,826 B2 | 10/2019 | Grajek |
| 10,567,385 B2 | 2/2020 | Quach |
| 10,572,874 B1 | 2/2020 | Shahidzadeh |
| 10,693,661 B1 | 6/2020 | Hamlet |
| 10,715,555 B1 | 7/2020 | Shahidzadeh |
| 10,824,702 B1 | 11/2020 | Shahidzadeh |
| 10,922,631 B1 | 2/2021 | Shahidzadeh |
| 10,951,606 B1 | 3/2021 | Shahidzadeh |
| 11,101,993 B1 | 5/2021 | Shahidzadeh |
| 11,005,839 B1 | 8/2021 | Shahidzadeh |
| 11,096,059 B1 | 8/2021 | Shahidzadeh |
| 11,133,929 B1 | 9/2021 | Shahidzadeh |
| 11,250,530 B1 | 2/2022 | Shahidzadeh |
| 11,252,573 B1 | 2/2022 | Shahidzadeh |
| 2003/0061111 A1 | 3/2003 | Dutta |
| 2003/0115142 A1 | 6/2003 | Brickell |
| 2004/0155101 A1 | 9/2004 | Royer |
| 2005/0060584 A1 | 3/2005 | Ginter |
| 2005/0102530 A1 | 5/2005 | Burrows |
| 2007/0011066 A1 | 1/2007 | Steeves |
| 2007/0033136 A1 | 2/2007 | Hu |
| 2007/0118891 A1* | 5/2007 | Buer .................... G06F 21/445 |
| | | 726/8 |
| 2007/0156611 A1 | 7/2007 | Gupta |
| 2007/0262136 A1 | 11/2007 | Ou |
| 2008/0101283 A1 | 5/2008 | Calhoun |
| 2008/0196088 A1 | 8/2008 | Vinokurov |
| 2008/0222283 A1 | 9/2008 | Ertugral |
| 2009/0077163 A1 | 3/2009 | Ertugral |
| 2009/0097661 A1 | 4/2009 | Orsini |
| 2009/0132808 A1 | 5/2009 | Baentsch |
| 2009/0259838 A1 | 10/2009 | Lin |
| 2009/0271847 A1 | 10/2009 | Karjala |
| 2009/0292927 A1 | 11/2009 | Wenzel |
| 2009/0307135 A1 | 12/2009 | Gupta |
| 2010/0228996 A1 | 9/2010 | Ginter |
| 2011/0035788 A1 | 2/2011 | White |
| 2011/0086612 A1 | 4/2011 | Montz |
| 2011/0093927 A1 | 4/2011 | Leppanen |
| 2011/0173017 A1 | 7/2011 | Salonen |
| 2011/0173448 A1 | 7/2011 | Baentsch |
| 2011/0204142 A1 | 8/2011 | Rao |
| 2011/0209200 A2 | 8/2011 | White |
| 2011/0244798 A1 | 10/2011 | Daigle |
| 2011/0288996 A1 | 11/2011 | Kreutz |
| 2011/0296513 A1 | 12/2011 | Kasad |
| 2011/0307949 A1 | 12/2011 | Ronda |
| 2012/0117157 A1 | 5/2012 | Ristock |
| 2012/0159177 A1* | 6/2012 | Bajaj .................... H04L 63/168 |
| | | 713/176 |
| 2012/0185547 A1 | 7/2012 | Hugg |
| 2012/0192260 A1 | 7/2012 | Kontsevich |
| 2012/0330788 A1 | 12/2012 | Hanson |
| 2013/0007849 A1 | 1/2013 | Coulter |
| 2013/0047202 A1* | 2/2013 | Radhakrishnan ....... H04L 63/10 |
| | | 726/1 |
| 2013/0047213 A1 | 2/2013 | Radhakrishnan |
| 2013/0111549 A1 | 5/2013 | Sowatskey |
| 2013/0185205 A1 | 7/2013 | Boss |
| 2013/0204708 A1 | 8/2013 | Ramachandran |
| 2013/0205133 A1 | 8/2013 | Hess |
| 2013/0298242 A1 | 11/2013 | Kumar |
| 2013/0305322 A1 | 11/2013 | Raleigh |
| 2014/0013108 A1* | 1/2014 | Pellikka ............... H04L 63/0853 |
| | | 713/156 |
| 2014/0040975 A1 | 2/2014 | Raleigh |
| 2014/0167917 A2 | 6/2014 | Wallace |
| 2014/0189808 A1 | 7/2014 | Gupta |
| 2014/0189809 A1 | 7/2014 | Koved |
| 2014/0189840 A1 | 7/2014 | Metke |
| 2014/0247155 A1 | 9/2014 | Proud |
| 2014/0304823 A1 | 10/2014 | Bruno |
| 2015/0058931 A1 | 2/2015 | Miu |
| 2015/0121462 A1* | 4/2015 | Courage ................. H04L 63/08 |
| | | 726/4 |
| 2016/0055690 A1 | 2/2016 | Raina |
| 2016/0189150 A1 | 6/2016 | Ahuja |
| 2017/0024531 A1 | 1/2017 | Malaviya |
| 2017/0032113 A1 | 2/2017 | Tunnell |
| 2017/0339176 A1 | 11/2017 | Backer |
| 2017/0357917 A1 | 12/2017 | Holmes |
| 2018/0012003 A1 | 1/2018 | Asulin |
| 2018/0108003 A1 | 4/2018 | Todasco |
| 2018/0276572 A1 | 9/2018 | Otillar |
| 2018/0316657 A1 | 11/2018 | Hardt |
| 2019/0028803 A1 | 1/2019 | Benattar |
| 2019/0110158 A1 | 4/2019 | Schwartz |
| 2019/0313967 A1 | 10/2019 | Lee |
| 2019/0378394 A1 | 12/2019 | Kawese |
| 2020/0042723 A1 | 2/2020 | Krishnamoorthy |
| 2020/0043118 A1 | 2/2020 | Sakaguchi |
| 2020/0175434 A1 | 6/2020 | Wisniewski |

(56) References Cited

U.S. PATENT DOCUMENTS

| | | |
|---|---|---|
| 2020/0242222 A1 | 7/2020 | Machani |
| 2020/0294680 A1 | 9/2020 | Gupta |
| 2020/0349247 A1 | 11/2020 | Seo |
| 2021/0133759 A1 | 5/2021 | Leddy |
| 2021/0176066 A1 | 6/2021 | Keith |

OTHER PUBLICATIONS

Smart, M.B. "Improving Remote Identity Authentication for Consumers and Financial Institutions", Order No. 10245677, ProQuest, 2016.

* cited by examiner

SYSTEM AND METHOD FOR BLUETOOTH PROXIMITY ENFORCED AUTHENTICATION

RELATED PATENT APPLICATIONS

The present invention claims priority to U.S. patent application Ser. No. 16/798,428, having a filing date of Feb. 24, 2020; which claims priority to U.S. patent application Ser. No. 15/700,153, having a filing date of Sep. 10, 2017; which claims priority to U.S. patent application Ser. No. 14/672,098, having a filing date of Mar. 28, 2015; which claims priority to U.S. Provisional Patent Application Ser. No. 61/972,245, filed Mar. 29, 2014; the disclosures of which are herein specifically incorporated by reference in their entirety.

FIELD OF THE INVENTION

The invention relates to the field of user identification and of performing multifactor authentication to enable authorization to perform services.

BACKGROUND

With the explosion of passwords and the ever increasing threat of online fraud, the need to improve authentication of users and their transactions as well as the usability of relying party applications across multiple sectors (financial institutions, healthcare, retailers, education institutions, government agencies and associated social services, social networks, etc.) is essential to mitigate the occurrence of information security fraud on a global scale. Furthermore, current authentication and authorization schemes provide an all or nothing approach, where the user either has complete control of all the resources provided by the login or none at all.

SUMMARY

Aspects of the embodiments disclosed herein include a method for authorizing a Client Device requested access, the method comprising: forming a proximity enforced Bluetooth binded communication link between the Client Device and a Level of Assurance (LOA) Provider; providing a login screen to a user entity at the Client Device from a Relying Party (RP) Services Application; receiving login information from the user entity; obtaining identity of the user entity on the LOA Provider using a biometric information of the user entity; sending the biometric information, a private key and contextual identifiers to an LOA Server; and identifying the user entity at the LOA Server using the biometric information, the private key and the contextual identifiers and the Client Device in determining whether to grant access to the RP Services Application.

Aspects of the embodiments disclosed herein further include a method comprising: receiving a request for an entity registration of an LOA Provider at an LOA Server, said request for the entity registration including a plurality of attributes and credentials, wherein the attributes are at least a unique identification information associated with an entity and the credentials are at least a unique information associated with the LOA Provider, identifying at the LOA Server the identity of the LOA Provider by performing a plurality of verification steps on the plurality of attributes and credentials; storing verified attributes and verified credentials at the LOA Server with a predetermined time to live value, wherein time to live is a predetermined time that the attributes or verified credentials are valid; performing a refresh to at least some of the verified attributes and the verified credentials based on predetermined policies and on demand from the RP Server; and providing from the LOA Server to the RP Server at least one of a plurality of transaction authorizations for each LOA per session or transactional request.

Aspects of the embodiments disclosed herein further include a method for facilitating an interaction of a Level of Assurance (LOA) Server with a Relying Party (RP) Server in a sequence of transactions with different Levels of Assurance (LOA), said method comprising: enrolling with the LOA Server at least one of a plurality of LOA Provider devices associated with an entity; uniquely identifying each of said entity enrolled LOA Provider devices to the RP Server; receiving at the LOA Server from an entity Client Device authentication of the enrolled LOA Provider devices to approve a secure interaction between the Client Device and the RP Server; authenticating at the LOA Server an entity up to a predetermined LOA using a plurality of contextual factors to be provided on demand from the LOA Provider device and sending real time authorization and authentication to the RP Server; performing selective policy enforcement at the LOA Server on the LOA Provider devices based on criteria received from said entity, a desired LOA, and criteria set by the RP Server; selectively approving or denying interactions at the LOA Server for the RP Server for transactions; and authenticating an entity up to an agreed-upon LOA using a plurality of factors to be provided on demand by the RP Server using the LOA Provider devices and the Client Device that can deliver a plurality of required contextual factors.

Aspects of the embodiments disclosed herein further include a method comprising: authenticating at a Level Of Assurance (LOA) Server from an RP Service Application executing on a Client Device, both the RP Server and an LOA Provider to enable an interaction based on an on-demand LOA desired per transaction; receiving at the LOA Server a request from the Client Device to register the LOA Provider, the request including a first unique identifier; said first unique identifier including at least one of a group consisting of: a unique user identification, a unique identity of the person, an International Mobile Equipment Identity (IMEI), a phone number, and a first secret message; receiving at the LOA Server from the LOA Provider an LOA Provider registration message; and stepping up and down to change the LOA at the LOA Server during the active session.

Aspects of the embodiments disclosed herein include a system for authorizing a transaction for an entity during an active session, the system comprising: a network configured to be communicatively coupled to a network; a processor configured to: receive, at a level of assurance (LOA) server, a request from a Relying Party (RP) Services Application for a transaction; determine, at the LOA Server, that the transaction requires a higher level of assurance than a current level of assurance associated with the active session associated with the entity; send, by the LOA Server, an authorization request for the transaction to an LOA Provider associated with the entity, wherein the authorization request comprises information indicating a higher level of authorization credentials required for elevating the level of assurance of the active session; receive, at the LOA Server, from the LOA Provider at least one of a plurality of required authorization credentials for elevating the LOA associated with the active session; determine, at the LOA Server, that the at least one of the plurality of authorization credentials received from the LOA Provider are sufficient to elevate the active session to the higher LOA; and sending authorization for servicing of the transaction for the entity to the RP Services Application. The authorization may be in real time with the real time period depending on the application.

Aspects of the embodiments disclosed herein further include a system comprising: a network configured to be communicatively coupled to a network; a processor configured to: receive a request for an entity registration of an LOA Provider at an LOA Server, said request for the entity registration including a plurality of attributes and credentials, wherein the attributes are at least a unique identification information associated with an entity and the credentials are at least a unique information associated with the LOA Provider, identify at the LOA Server the identity of the LOA Provider by performing a plurality of verification steps on the plurality of attributes and credentials; store verified attributes and verified credentials at the LOA Server with a predetermined time to live value, wherein time to live is a predetermined time that the attributes or verified credentials are valid; perform a refresh to at least some of the verified attributes and the verified credentials based on predetermined policies and on demand from the RP Server; and provide from the LOA Server to the RP Server at least one of a plurality of transaction authorizations for each LOA per session or transactional request.

Aspects of the embodiments disclosed herein further include a system for facilitating an interaction of a Level of Assurance (LOA) Server with a Relying Party (RP) Server in a sequence of transactions with different Levels of Assurance (LOA), said system comprising: a network configured to be communicatively coupled to a network; a processor configured to: enroll with the LOA Server at least one of a plurality of LOA Provider devices associated with an entity; uniquely identify each of said entity enrolled LOA Provider devices to the RP Server; receive at the LOA Server from an entity Client Device authentication of the enrolled LOA Provider devices to approve a secure interaction between the Client Device and the RP Server; authenticate at the LOA Server an entity up to a predetermined LOA using a plurality of contextual factors to be provided on demand from the LOA Provider device and sending real time authorization and authentication to the RP Server; perform selective policy enforcement at the LOA Server on the LOA Provider devices based on criteria received from said entity, a desired LOA, and criteria set by the RP Server; selective approving or denying interactions at the LOA Server for the RP Server for transactions; and authenticate an entity up to an agreed-upon LOA using a plurality of factors to be provided on demand by the RP Server using the LOA Provider devices and the Client Device that can deliver a plurality of required contextual factors.

Aspects of the embodiments disclosed herein further include a system comprising: a network configured to be communicatively coupled to a network; a processor configured to: authenticate at a Level Of Assurance (LOA) Server from an RP Service Application executing on a Client Device, both the RP Server and an LOA Provider to enable an interaction based on an on-demand LOA desired per transaction; receive at the LOA Server a request from the Client Device to register the LOA Provider, the request including a first unique identifier; said first unique identifier including at least one of a group consisting of: a unique user identification, a unique identity of the person, an International Mobile Equipment Identity (IMEI), a phone number, and a first secret message; receive at the LOA Server from the LOA Provider an LOA Provider registration message; and step up and down to change the LOA at the LOA Server during the active session.

Aspects of the embodiments disclosed herein further include a non-transitory computer readable medium storing a program causing a computer to execute a process for authorizing a transaction for an entity during an active session, the process comprising: receiving, at a level of assurance (LOA) server, a request from a Relying Party (RP) Services Application for a transaction; determining, at the LOA Server, that the transaction requires a higher level of assurance than a current level of assurance associated with the active session associated with the entity; sending, by the LOA Server, an authorization request for the transaction to an LOA Provider associated with the entity, wherein the authorization request comprises information indicating a higher level of authorization credentials required for elevating the level of assurance of the active session; receiving, at the LOA Server, from the LOA Provider at least one of a plurality of required authorization credentials for elevating the LOA associated with the active session; determining, at the LOA Server, that the at least one of the plurality of authorization credentials received from the LOA Provider are sufficient to elevate the active session to the higher LOA; and sending authorization for servicing of the transaction for the entity to the RP Services Application.

Aspects of the embodiments disclosed herein further include a non-transitory computer readable medium storing a program causing a computer to execute a process, the process comprising: receiving a request for an entity registration of an LOA Provider at an LOA Server, said request for the entity registration including a plurality of attributes and credentials, wherein the attributes are at least a unique identification information associated with an entity and the credentials are at least a unique information associated with the LOA Provider, identifying at the LOA Server the identity of the LOA Provider by performing a plurality of verification steps on the plurality of attributes and credentials; storing verified attributes and verified credentials at the LOA Server with a predetermined time to live value, wherein time to live is a predetermined time that the attributes or verified credentials are valid; performing a refresh to at least some of the verified attributes and the verified credentials based on predetermined policies and on demand from the RP Server; and providing from the LOA Server to the RP Server at least one of a plurality of transaction authorizations for each LOA per session or transactional request.

Aspects of the embodiments disclosed herein further include a non-transitory computer readable medium storing a program causing a computer to execute a process for facilitating an interaction of a Level of Assurance (LOA) Server with a Relying Party (RP) Server in a sequence of transactions with different Levels of Assurance (LOA), the process comprising: enrolling with the LOA Server at least one of a plurality of LOA Provider devices associated with an entity; uniquely identifying each of said entity enrolled LOA Provider devices to the RP Server; receiving at the LOA Server from an entity Client Device authentication of the enrolled LOA Provider devices to approve a secure interaction between the Client Device and the RP Server; authenticating at the LOA Server an entity up to a predetermined LOA using a plurality of contextual factors to be provided on demand from the LOA Provider device and sending real time authorization and authentication to the RP Server; performing selective policy enforcement at the LOA Server on the LOA Provider devices based on criteria received from said entity, a desired LOA, and criteria set by the RP Server; selectively approving or denying interactions at the LOA Server for the RP Server for transactions; and authenticating an entity up to an agreed-upon LOA using a plurality of factors to be provided on demand by the RP Server using the LOA Provider devices and the Client Device that can deliver a plurality of required contextual factors.

Aspects of the embodiments disclosed herein further include a non-transitory computer readable medium storing a program causing a computer to execute a process comprising: authenticating at a Level Of Assurance (LOA) Server from an RP Service Application executing on a Client Device, both the RP Server and an LOA Provider to enable an interaction based on an on-demand LOA desired per transaction; receiving at the LOA Server a request from the Client Device to register the LOA Provider, the request including a first unique identifier; said first unique identifier including at least one of a group consisting of: a unique user identification, a unique identity of the person, an International Mobile Equipment Identity (IMEI), a phone number, and a first secret message; receiving at the LOA Server from the LOA Provider an LOA Provider registration message; and stepping up and down to change the LOA at the LOA Server during the active session.

Aspects of the embodiments disclosed herein include a system for authorizing a transaction for an entity during an active session, the system comprising: a means for receiving, at a level of assurance (LOA) server, a request from a Relying Party (RP) Services Application for a transaction; a means for determining, at the LOA Server, that the transaction requires a higher level of assurance than a current level of assurance associated with the active session associated with the entity; a means for sending, by the LOA Server, an authorization request for the transaction to an LOA Provider associated with the entity, wherein the authorization request comprises information indicating a higher level of authorization credentials required for elevating the level of assurance of the active session; a means for receiving, at the LOA Server, from the LOA Provider at least one of a plurality of required authorization credentials for elevating the LOA associated with the active session; a means for determining, at the LOA Server, that the at least one of the plurality of authorization credentials received from the LOA Provider are sufficient to elevate the active session to the higher LOA; and a means for sending authorization for servicing of the transaction for the entity to the RP Services Application.

Aspects of the embodiments disclosed herein further include a system comprising: a means for receiving a request for an entity registration of an LOA Provider at an LOA Server, said request for the entity registration including a plurality of attributes and credentials, wherein the attributes are at least a unique identification information associated with an entity and the credentials are at least a unique information associated with the LOA Provider, a means for identifying at the LOA Server the identity of the LOA Provider by performing a plurality of verification steps on the plurality of attributes and credentials; a means for storing verified attributes and verified credentials at the LOA Server with a predetermined time to live value, wherein time to live is a predetermined time that the attributes or verified credentials are valid; a means for performing a refresh to at least some of the verified attributes and the verified credentials based on predetermined policies and on demand from the RP Server; and a means for providing from the LOA Server to the RP Server at least one of a plurality of transaction authorizations for each LOA per session or transactional request.

Aspects of the embodiments disclosed herein further include a system for facilitating an interaction of a Level of Assurance (LOA) Server with a Relying Party (RP) Server in a sequence of transactions with different Levels of Assurance (LOA), said system comprising: a means for enrolling with the LOA Server at least one of a plurality of LOA Provider devices associated with an entity; a means for uniquely identify each of said entity enrolled LOA Provider devices to the RP Server; receive at the LOA Server from an entity Client Device authentication of the enrolled LOA Provider devices to approve a secure interaction between the Client Device and the RP Server; a means for authenticating at the LOA Server an entity up to a predetermined LOA using a plurality of contextual factors to be provided on demand from the LOA Provider device and sending real time authorization and authentication to the RP Server; a means for performing selective policy enforcement at the LOA Server on the LOA Provider devices based on criteria received from said entity, a desired LOA, and criteria set by the RP Server; a means for selectively approving or denying interactions at the LOA Server for the RP Server for transactions; and a means for authenticating an entity up to an agreed-upon LOA using a plurality of factors to be provided on demand by the RP Server using the LOA Provider devices and the Client Device that can deliver a plurality of required contextual factors.

Aspects of the embodiments disclosed herein further include a system comprising: a means for authenticate at a Level Of Assurance (LOA) Server from an RP Service Application executing on a Client Device, both the RP Server and an LOA Provider to enable an interaction based on an on-demand LOA desired per transaction; a means for receiving at the LOA Server a request from the Client Device to register the LOA Provider, the request including a first unique identifier; said first unique identifier including at least one of a group consisting of: a unique user identification, a unique identity of the person, an International Mobile Equipment Identity (IMEI), a phone number, and a first secret message; a means for receiving at the LOA Server from the LOA Provider an LOA Provider registration message; and a means for stepping up and down to change the LOA at the LOA Server during the active session.

BRIEF DESCRIPTION OF THE DRAWINGS

Aspects of the embodiments of this disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1A:
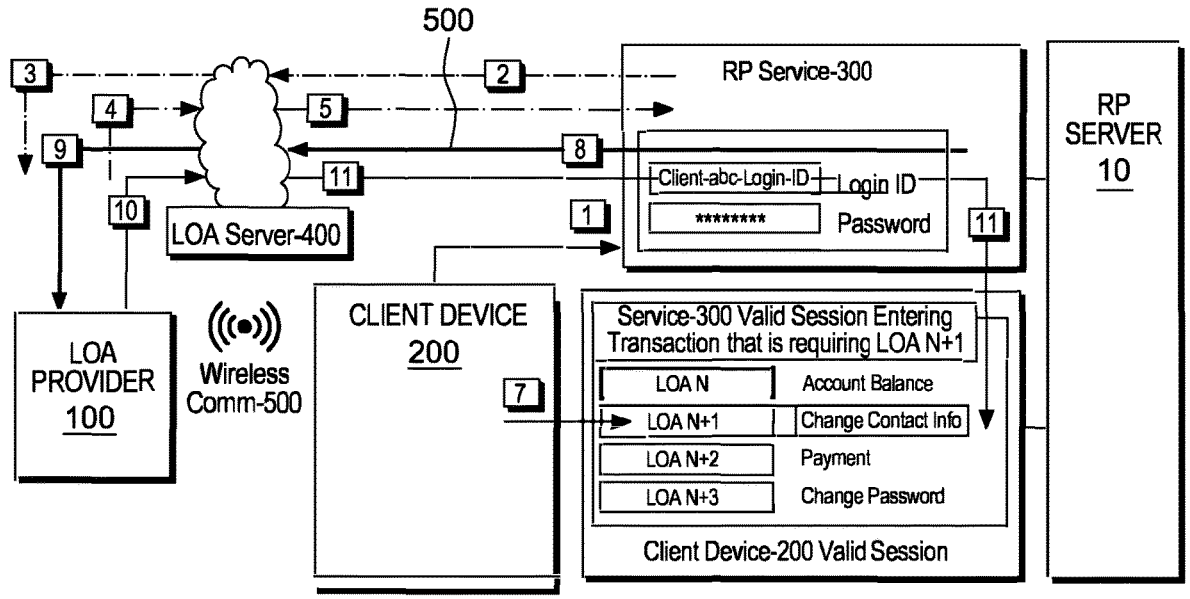
FIG. 1A illustrates a system and method for Dynamic On Demand Authentication and Authorization as a function of the level of assurance (LOA) using an LOA Provider(s).

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Below are example definitions that are provided only for illustrative purposes in this disclosure below and should not be construed to limit the scope of the embodiments disclosed herein in any manner.

Active Session: a user entity is validly logged into an identity provider such as a Relying Party (RP) Services Application.

Attributes: unique identification information associated with an entity such as biometric information, spatial, location and/or behavior.

Authentication Assurance: the degree of confidence reached in the authentication process that the communication partner (human or machine) is the entity that it claims to be or is expected to be. The confidence may be based on the degree of confidence in the binding between the communicating entity and the user identity that is presented.

Identity Assurance: the degree of confidence in the process of identity validation and verification used to establish the identity of the user entity to which the credential was issued and the degree of confidence that the entity that uses the credential is that entity or the entity to which the credential was issued or assigned.

Contextual Identifiers (or Contextual Factors): may be part of the verification process and may include the following multifactors used singularly or in different combinations: location, biometrics (e.g., heartbeat monitoring, iris recognition, fingerprint, voice analysis, deoxyribonucleic acid (DNA) testing), user habits, user location, spatial, body embedded devices, smart tattoos, dashboard of user's car, user's television (TV), user's home security digital fingerprint, Domain Name System (DNS), Virtual Private Network (VPN), and the like.

Credentials: may take several forms, including but not limited to: (a) personally identifiable information such as name, address, birthdate, etc.; (b) an identity proxy such a username, login identifier (user name), or email address; (c) some biometric identifiers such as fingerprint or voice, face, etc.; (d) an X.509 digital certificate; and/or (e) a digital fingerprint and approval from a user-binded device.

Level of Assurance (LOA): a level of confidence for identity proofing for the binding between level of access for an entity and the presented identity information.

LOA Provider: may be a mobile or stationary device associated with the user entity registered with a LOA Server or Relying Party and configured to confirm (or decline) a transaction authorizing access to elevated Relying Party Services. Alternatively, the LOA Provider may be a human who provides the biometric information or decision to approve or decline through a device (e.g., mobile device, desktop computer, tablet, etc.) via collection of methods and credentials.

LOA Server: a server that provides an identity verifier service and may be a Machine2Machine (M2M) server. The LOA Server(s) may be part of the same server as the Relying Party Server or located in a separate server at the same or a remote location.

Real Time: the time associated with authorization periods described herein range depending on the type of transaction, need and urgency for authorization. The authorization time periods may vary from under 10 seconds to 24 hours or more. Real time authorization as used herein prevents fraud at its inception versus mitigating it in a post event notification. In one implementation, real time may refer to the time for the transaction to complete.

Refresh: periodically, an LOA Server will perform a "refresh" to update at least some of the plurality of verified attributes and the verified credentials based on predetermined policies and on demand from the RP Server. For example, refresh can be a time based or policy or rule based reconnection of a LOA Provider to the LOA Server to say that a remote secure password is renewed or changes.

Relying Party (RP): could be an entity in multiple sectors requiring secure interactions such as financial institutions, healthcare, retailers, education institutions, government agencies and associated social services, social networks, websites, et al. A RP will typically use a server (i.e., the RP Server) as a manifestation of its intentions.

Relying Party (RP) Services: can be any transaction including authorized login such as Web or on-premise log-in; Virtual Private Network (VPN) log-in; transaction monitoring; financial transaction for online or a point of sale (such as the dollar amount, type of transaction including check versus wire versus cashier check; a workflow for approving; viewing or modifying data on a server; access to confidential versus restricted data, and/or physical access control to a building or secure space. RP Services may typically be any web or on-premises service requiring approval for access with dynamic different levels of assurance within. RP Services can be an application (i.e., Relying Party (RP) Services Application) residing on a Client Device; be part of an RP Server; and/or be located at a separate server. In addition, an RP Service may be an application executing on a Client Device and connected to the RP Server(s) and/or located at a separate server, wherein the RP Server(s) and/or separate server provides the data and executables for providing the service through the application.

User Entity: throughout this disclosure consumer, user, user entity, entity, machine entity, user agent, client, client agent, subscriber, requesting agent and requesting party shall mean the same and may be human or machine.

For online transactions, be it financial transactions, data mining, or simple logins, physical access control system, workflows, identity proofing the user entities (human or non-human) need to identify themselves on-premises or remotely and reliably with a certain required degree of certainty. The desired level of assurance (LOA) of each associated transaction or session, for example at login or individually within a login session may vary and hence require real time response as a function of the associated LOA required for each transaction or each level of access within the session. For example, a login session for an online banking service (a typical example of an RP) may require not only a credential-based trust model (e.g., simple user name and password) for general login and looking at balance history but may need a dynamic transactional-based model where additional factor(s) are required to transact a transfer or payment. Upon the initiation of a transaction with a higher LOA for the session login, the system may ask the user for additional verification to authorize the transaction. Upon completion of a transaction the session credential will resume to baseline credential based at the lower LOA till the next transaction and associated LOA is presented or perhaps the session is terminated per policies orchestrated (e.g., time of inactivity). In this description, "time to live" is the pre-determined time that the attributes or verified credentials are valid for. Periodically, an LOA Server will perform a "refresh" to update at least some of the plurality of verified attributes and the verified credentials based on predetermined policies and on demand from the RP Server. In the online banking example, to authorize the login and access to account balance versus a transaction, such as an online payment, the method and system disclosed herein may require different LOAs with different types of multifactor authentication and out of band identity proofing such as using a combination of contextual information such as location, biometrics and digital fingerprint of a user-binded LOA Provider device, such as a smart phone or wearable with a unique set of attributes and capabilities.

The user entity with a particular identity made by some entity can be trusted to actually be the claimant's "true" identity. Identity claims are made by presenting an identity credential to the RP. In the case where the user entity is a person, this credential may take several forms, including but not limited to: (a) personally identifiable information such as name, address, birthdate, etc.; (b) an identity proxy such a username, login identifier (user name), or email address; (c) some biometric identifiers such as fingerprint or voice, face, etc.; (d) an X.509 digital certificate; and/or (e) a digital fingerprint and approval from a user-binded device.

Note that Identity Assurance specifically refers to the degree of certainty of an identity assertion made by an identity provider which may be machine (e.g., LOA Server), service or user by presenting an identity credential to the RP. In order to issue this assertion, the identity provider must first determine whether or not the claimant requesting the transaction possesses and controls an appropriate token using a predefined authentication protocol. Depending on the outcome of this authentication procedure, the assertion returned to the RP by the identity provider allows the RP to decide whether or not to trust that the identity associated with the credential actually "belongs" to the person or entity presenting the requested credential.

Disclosed herein is a method and system for providing a solution and a framework of trust that enables dynamic variable authentication of a user or machine entity and delivers techniques to mitigate threat vectors using multifactor Contextual Identifiers associated with each of the transactions or sessions of access. Reducing threat levels enables higher level of trust and trust elevation of cyber transactions. The system and method described herein rely on risk models associated with the transactions and depend on validation of the requesting agent referred to as verifying users (or machines) that are deemed to be who or what they claim they are. The system and method described herein allow for real time multifactor authentication using a unique device (or set of devices) to enable authorization to perform services for any online service or application that requires user identification and secure dynamic authorization. The methods and systems described herein allow for dynamic fluctuation of LOA (i.e., rise and fall of LOA) and associated authorizations. RP Services can be any transaction including authorized login to a valid Active Session; transaction monitoring; approval for access all with dynamic different LOAs within; on-premises or web login; financial transaction approval online or at Point of Sale (POS); other financial service transactions involving banks, bonds, stocks, etc.; data transactions; physical access; identity proofing; and/or workflow. The level of assurance (LOA) of the authentication may be on a distributed and dynamic authenticated system.

The dynamic system and method described herein delivers on-demand LOA depending on the RP's requirements, orchestrated by policies set by the RP and/or the user entity, and possibly augmented by other regulatory requirements based on a fine-grain control requirement of the authentication token(s). The level of assurance may dynamically throttle (or step) up and down depending on each transaction authentication requirement. Besides the RP Server(s) and LOA Provider/user, the LOA Server(s) can also be involved in setting the LOA based policies. The LOA Server(s) may be configured to recognize an irregularity or irregularities in a transaction. For example, in a hospital scenario a nurse not scheduled for a current shift might be detected by the LOA Server(s) accessing a medicine cabinet with their identification. This might be a policy violation that would further require additional real time multifactor authorization and authentication such as a biometric input from the nurse (e.g., fingerprint) using the local device securing the medicine cabinet before the cabinet door is opened. In another scenario, in a transaction for a purchase of alcohol using a credit card that is issued to a minor may get automatically declined by the LOA Server(s) independently of policies provided by the RP Server(s) and/or LOA Provider/user.

The elevation of the authentication credentials (replace token with credential) for required LOA starts at the lowest level of required assurance level for transaction(s). In one embodiment, an authentication token is a token that is generated based on demand authorization on a certain LOA required and has the metadata that was defined by the RP as a function of the risk tolerance of the RP and the user entity. For example for a user to have access to an account for viewing purposes only for the online banking versus an actual transaction within the session will require a higher LOA. Once the transaction completes, the session and the associated assurance level token may expire and user level assurance level may be stepped down to a lower level such as "login/view only". This may provide confidence that the higher level of assurance may be valid only for the one particular transaction it was intended for and immediately the LOA may be stepped down to "login/view only." The authorization token(s) is used as a vehicle to control clients' authorization across different levels of on-demand assurance requirements minimizing the threats of replay attacks, man in the middle, hijacking and various other cyber transaction attacks. In an exemplary transaction, the address of the Point of Sale (POS) is different than the GPS location of the user device (i.e., user is in New York but the purchase is in Los Angeles). This scenario would provoke a warning at an LOA Server(s) that may result in a higher LOA and policy to approve via a Contextual Identifier, biometric, or digital fingerprinting by simply approving using a mobile device.

The authorization token depends on the desired policy (e.g., RP, user entity or regulatory) of the transaction that can have a discrete identifier for the associated required level of assurance and a plurality of predetermined Contextual Factors set by the policy orchestrator as a function of risk tolerance associated with the transaction. Such discrete identifiers can be part of the metadata exchanged as part of the transaction request between machines and LOA Provider/user.

The RP (e.g., bank or website), the user entity and the identity provider (e.g., LOA Provider such as a mobile device) may all play a collaborative role in initiating, verifying, directing and responding to the requested transaction. Note that the user entity may be provided control by setting the initial LOA (e.g., I am John Smith, here is my user-binded device to this service, I am at my home and here is my face/voice/login/fingerprint . . . ). The LOA Server(s) shall typically hold the validated token on the initial LOA and depending on the incoming transactions, will demand in a real-time transaction authorization and authentication as a function of the required "Level of Assurance" (LOA). The "Level of Assurance" reflects the level of confidence in the identity of the user entity required by the RP's desired Authentication Assurance. This may be derived from the RP's associated risk assessment, risk appetite and risk mitigation principles which defines the level of confidence. This level of confidence is then provided by the identity provider or by an intermediary service. The identity verifier service (or authentication service) can be provided by an LOA Server(s) or an M2M partner who is in the identity verification business like the Department of Motor Vehicles (OMV), E-Verify or Social Security Number Verification Services, etc. The verification of the Contextual Factors for meeting the desired LOA can be part of the transaction identifier requirement and may be passed to the user entity (human or machine).

As discussed above, RP Services offered by an RP can be any transaction including authorized login to a valid Active Session; transaction monitoring; approval for access all with dynamic different LOAs within; on-premises or web login; financial transaction approval online or at Point of Sale (POS); other financial service transactions involving banks, bonds, stocks, etc.; data transactions; physical access; identity proofing; and/or workflow. The exchange method of mutual authentication is at a user entity level or at a subscriber device. It may be accessed by an authentication server (e.g., the LOA Server) through wired or wireless communication. This mutual authentication may involve a multifactor authenticated key exchange method wherein the LOA Provider subscriber device (e.g., a mobile device) transmits a key to the LOA Server(s) whereby the key is generated using an identifier of the subscriber device and some method of authentication to an LOA Server(s) as described below.

Figure 1B:
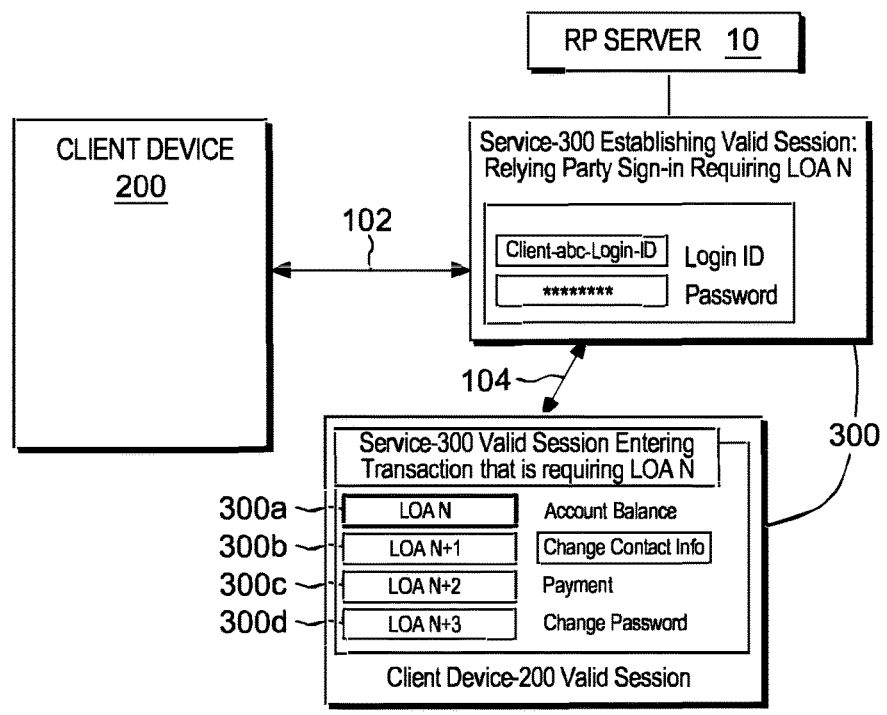
FIG. 1B illustrates an exemplary Client Device 200 for securely interacting with a Relying Party (RP) Server(s) 10 through an RP Services Application using dynamic and on-demand authentication and authorization at least based on the LOA.

According to one or more aspects of the embodiments of this disclosure as illustrated by FIGS. 1A and 1B, techniques described herein enable an enrolled and approved LOA Provider 100 to be used for supporting multifactor authentication for an online RP Services Application 300 or any application that requires identification and authorization (including access to the car or house, financial transactions, Point of Service, online bank note or stock exchange, identity proofing, etc.) of an RP service provided by a backend RP Server(s) 10 through an authentication LOA Server(s) 400. Delivery of the multifactor authentication to the RP Server(s) 10 is through secure communication and a series of remote challenge-response mechanisms, establishing trusted communication channels between the RP Server(s) 10 and an LOA Server(s) 400 and then from the LOA Server(s) 400 to the user's LOA Provider device 100 through a network 500 all enabled by the LOA Server(s) 400 as a remote service. Alternatively, this system and method can be initiated as an onsite local communication between the LOA Provider 100 and the user entity Client Device 200 via a proximity enforced communication scheme such as Wireless Fidelity (WiFi), Bluetooth Low Energy (BTLe), Near Field Communications (NFC), et al. As an example, a local authorization could be in the form of mobile device such as a phone sending a key to a Client Device 200 via Bluetooth® to unlock locally. Additional Contextual Factors and policies such as location, user habits, biometrics, etc. can further assist with early warning fraud prevention mechanisms elevating trust for the RP services.

FIGS. 1A and 1B illustrate an exemplary user entity (or client) device 200 for securely interacting with (102) (e.g, logging into, stepping up or down LOA's) an RP Service using dynamic on demand authentication and authorization based on the LOA. FIGS. 1A and 1B illustrate using the LOAs as a login but that is just one example of a plurality of different types of dynamic LOA changes described herein. FIGS. 1A and 1B illustrate that login may be followed by transactions within an Active Session. Transactions such as changing personal data such as email, phone, and home address; using different amounts in online transactions and transfers; any general changes to any workflows (e.g., approval of purchase orders); physical access to rooms within a facility (e.g., hospital rooms); access to medicine cabinets within rooms; access to buildings (e.g., dwellings); identity proofing; prescription and medical procedures or orders; and/or financial services such as card, stock and bond exchanges are all examples of uses of dynamic LOA change which will be described herein.

Figure 2A:
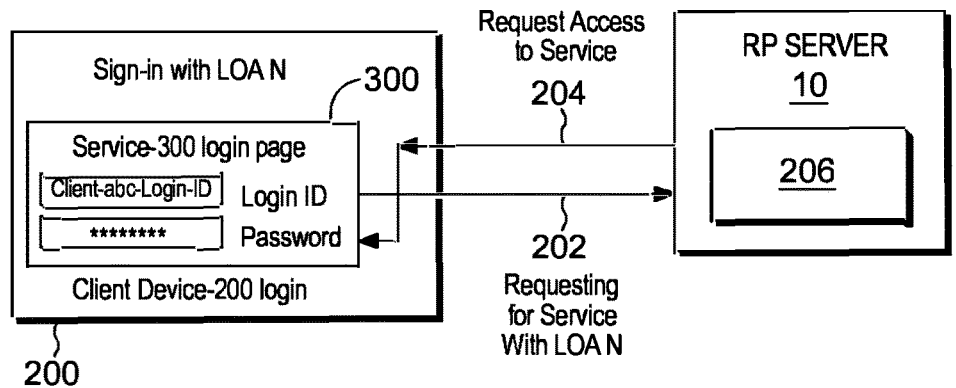
FIG. 2A illustrates an embodiment for interacting with RP Services from a Client Device 200 and requesting access with a particular Level of Assurance N (LOA N).
Figure 2B:
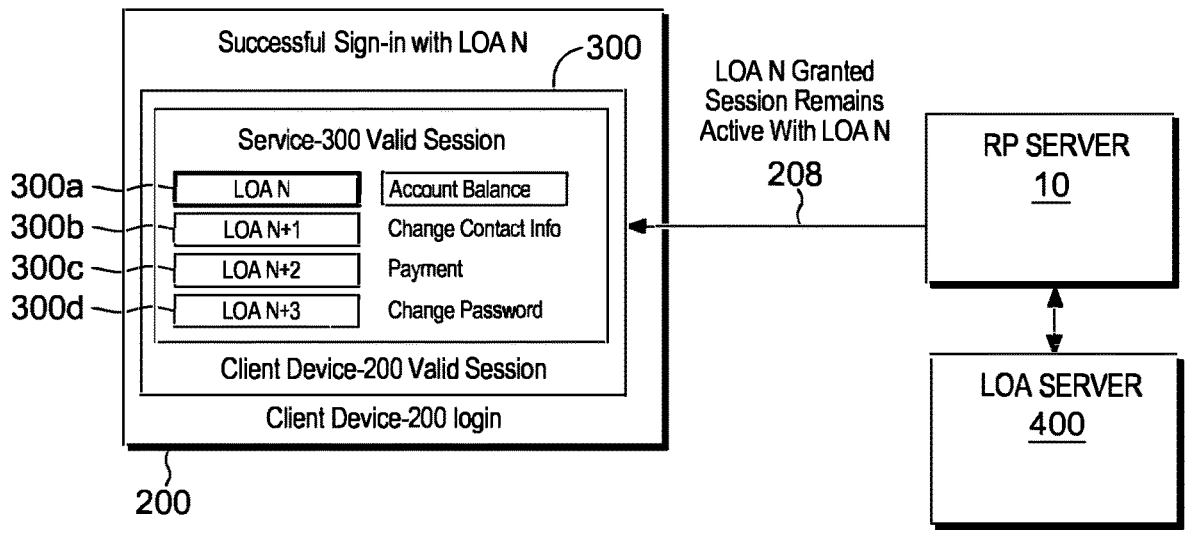
FIG. 2B illustrates a Client Device having access to RP Services Application 300 and all services with a Level Of Assurance N (LOA N).

As shown in FIGS. 1A and 1B, a backend RP Server(s) 10 may provide a number of different account services, capabilities and information associated with an account or user. In one embodiment, the RP Server(s) 10 may be owned or operated by a financial institution or any other entity that maintains sensitive data. RP Services Application views 300 of a webpage of the various RP Services offered by such an RP are shown in FIGS. 1A and 1B which are displayed on the user entity device (or Client Device) 200 after login (104). The RP Service Application 300 may be provided as a native application, an application running as a cloud service, a web browser interface or another suitable interface on Client Device 200. Each RP Service may be associated with a different level of assurance (LoA) of the identity of the user entity (or machine) accessing the RP Service. For an example RP Service shown in FIG. 1B, viewing the account balance 300a has the lowest LOA associated with it, and may be accessible as soon as the user entity enters the login identification (ID) and password and the information is verified by the RP Server(s) 10. In contrast, other functions may require higher LOAs. For example, changing contact information (LOA N+1) 300b, making a payment (LOA N+2) 300c or changing the password (LOA N+3) 300d are RP Services that may require higher LOAs associated with the user entity identity before allowing those functions to be completed FIG. 2A illustrates an embodiment for securely interacting (e.g. logging into, stepping up or down the LOA) with a RP Services Application 300 requesting access for signing on with a particular Level of Assurance N (LoA N) (step 202). A user entity via a Client Device 200 (e.g., desktop computer, tablet, wireless device, etc.) uploads RP Services Application 300 providing a list of online RP Services through a webpage, application, or any other appropriate manner and enters an authenticating login ID and password to create an Active Session (step 204). In some embodiments, the LOA service may be directly provided by the backend RP Server(s) 10 (e.g., LOA Server module(s) 206). Therefore, all services provided by the LOA Server 400 described herein may also be located on the backend RP Server(s). However, as shown in FIG. 2B, in typical embodiments, the request to access the LOA service may be redirected to a segregated or remote LOA Server(s) 400. Security is improved by isolating the LOA Server(s) 400.

FIG. 2B illustrates a user entity through client device 200 having access to RP Services 300a and all RP Services with the Level Of Assurance N (LOA N). The RP Server(s) (or RP Servers) 10 enables loading of the user interface for the user login and password. The top block 300a designated "LoA N Services" illustrates the establishment of a valid Active Session for the RP Services Application 300 with LOA N (step 208). Blocks 300b-300d in FIG. 2B illustrate the different levels of RP Services associated with the RP for different LOA requirements. Furthermore, each RP Service may be further associated with a particular LOA, and additional contextual requirements (e.g., Contextual Factors) for gaining authentication for such a particular level of assurance, may automatically provide the user entity with access to the RP Services available from the RP Server(s) 10 at that level and lower LOA. In FIG. 2B the user entity has been granted access to LoA N such as viewing an account balance as an example. In at least one implementation, the user entity through the Client Device 200 may have access to the LoA N till the user entity logs out, a timer has expired or a request for a different LoA is submitted.

Figure 3:
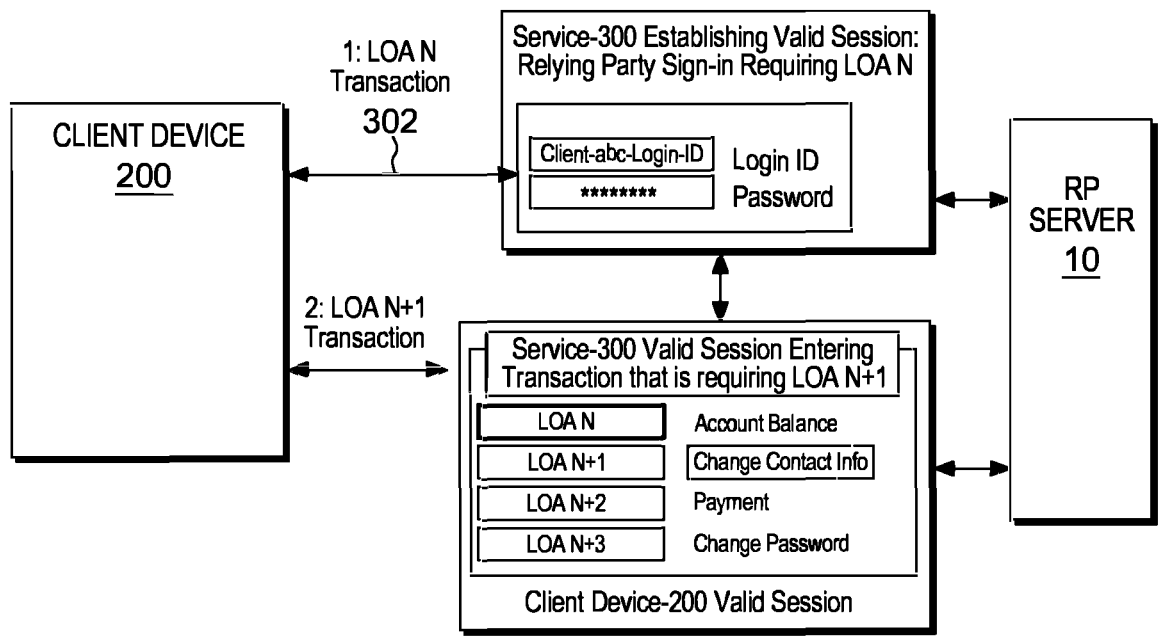
FIG. 3 illustrates a Client Device 200 using Dynamic On Demand Authentication and Authorization to request an RP Service with Level Of Assurance N+1 (LOA N+1).
Figure 4:
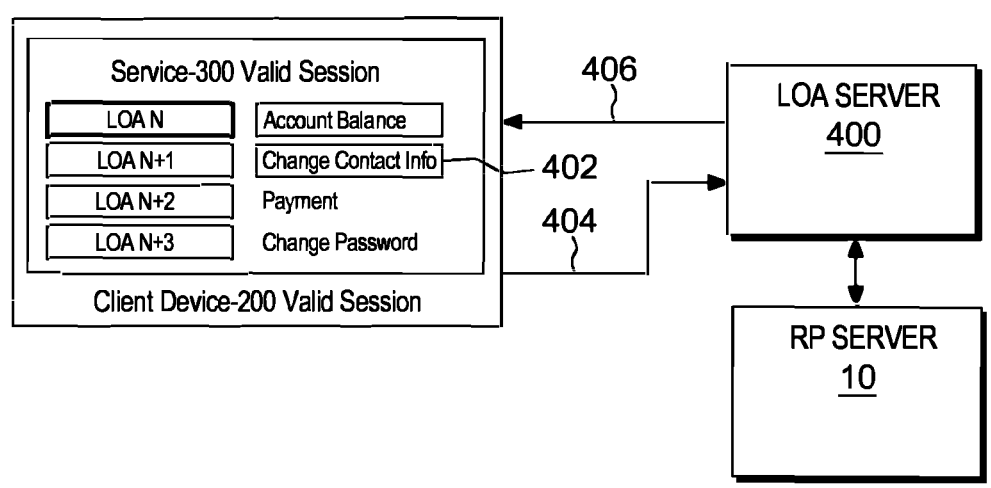
FIG. 4 shows a Client Device 200 requesting authorization for LOA N+1 type transaction (e.g., for a service such as Change Contact Information).

FIG. 3 illustrates user entity at Client Device 200 using dynamic on demand authentication and authorization requesting a service with LOA N+1. The user entity in step 302, first logs into the system at LOA N displayed on a RP Services Application 300 webpage at Client Device 200 and then requests escalation of the level of assurance to LOA N+1 by requesting access to change contact information. As shown in FIG. 3, the backend RP Server(s) 10 may allow the user entity using the Client Device 200 to browse account information, using a login/password and a simple accept via LOA Provider 100, however, the RP may need higher LOAs to allow the user to modify user account information. FIG. 4 shows a user entity requesting authorization for an LOA N+1 type transaction (e.g., fora service such as Change Contact Information) as follows:

At a first step 402, the user entity requests access to LOA N+1 from LOA N.

At a second step 404, the RP sends the request to the LOA Provider 400 for a real time transaction authorization with LOA N+1.

At a third step 406, the LOA Provider 400 submits a secure remote real time transaction authorization with LOA N+1.

Figure 5:
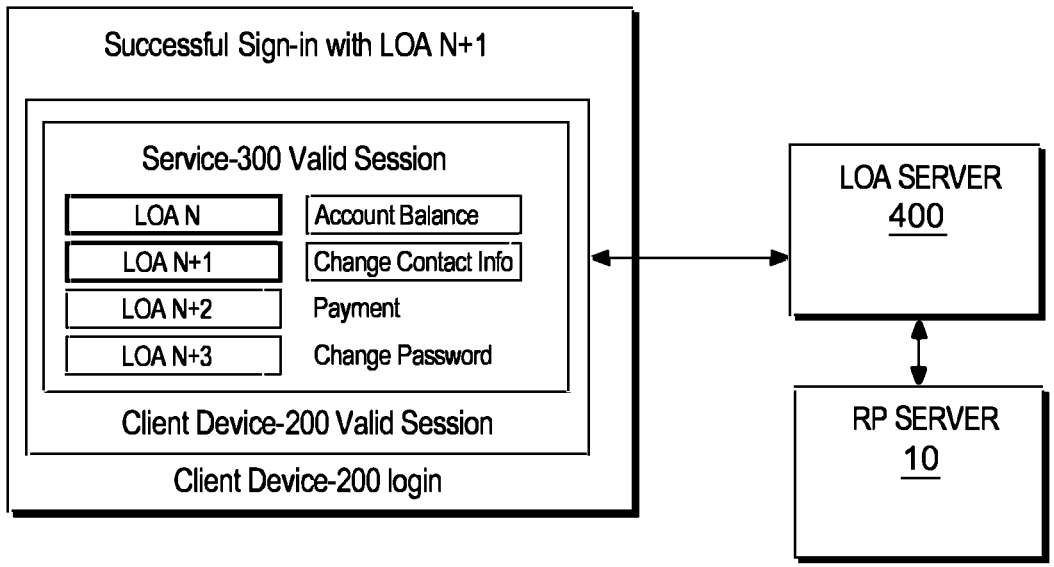
FIG. 5 shows that the Client Device 200 was granted authorization for an LOA N+1 transaction.
Figure 6:
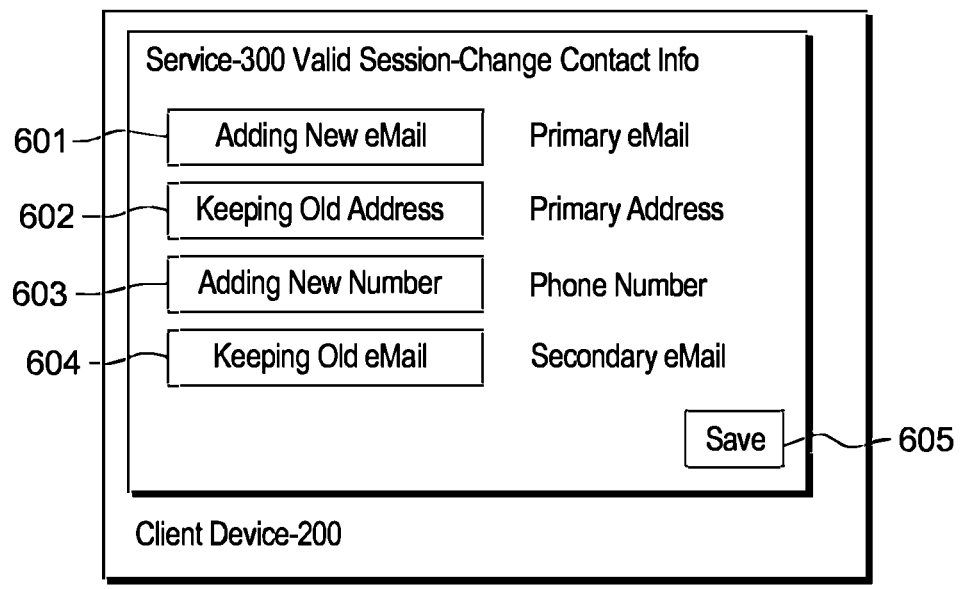
FIG. 6 shows the RP Services available with LOA N+1.
Figure 7:
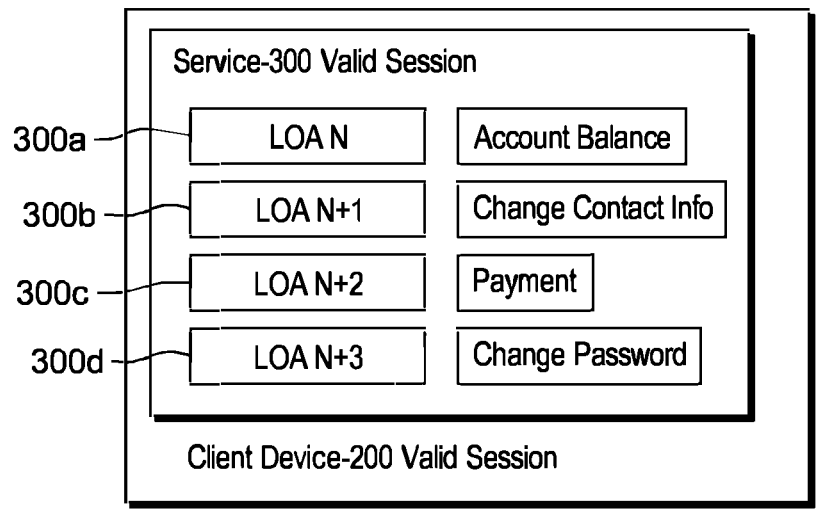
FIG. 7 shows that the Client Device 200 was denigrated back to LOA N.

FIGS. 5 and 6 show the user entity at Client Device 200 was granted authorization for a LOA N+1 transaction. At LOA N+1, the RP Server(s) 10 may allow access to RP Services associated with LOA N and LOA N+1. For example, a designator such as account balance and change contact information may be allowed. The LOA N+1 session may remain active for the duration of the LOA N+1 transaction, a predetermined time of period, or may expire upon a predetermined time of inactivity. Once the user entity at Client Device 200 completes the LOA N+1 transaction the RP may denigrate the session back to LOA N. For example, once the session is elevated to a LOA N+1, the RP may allow the user to update a number fields shown in FIG. 6, such as 1) adding new email address, 2) editing or keeping old address, 3) adding new number, and 4) keeping old email. Once the user entity 5) saves the information the session may exit out of "Change Contact Information". Furthermore, in at least one embodiment, once the user entity exits out of change of contact, the user entities level of assurance may optionally be denigrated back to LOA N. In the Active Session it resumes back to LOA N upon completing an LOA N+1 transaction. Referring to FIG. 7, 300a indicates the level of access allowed in the Active Session, while 300b, 300c, and 300d indicate levels of access not allowed at any given period of time. While in a valid Active Session (neither expired nor logged out) the user entity can select any of the services depending on the LOA number. The LOA Provider 400 can provide LOA N+x assurance to enable an RP Service.

In some embodiments, the elevation of the LOA may be performed by authenticating the user using an out of band channel such as the protocol described herein. With the explosion of passwords and the ever increasing threat of online fraud, the need to improve authentication of users and their transactions as well as the usability of RP applications across multiple sectors (e.g., financial institutions, healthcare, retailers, educational institutions, government agencies and associated social services, social networks, et al.) is essential to mitigate the occurrence of information security fraud on a global scale.

With increasing prevalence of mobile devices (including wearables such as smart watches) in every day operations, the use of such personal devices as a secure multifactor for customer and transaction authentication combined with an LOA Server(s) which may be a Machine to Machine (M2M) server and a secure communication protocol may significantly mitigate online fraud. The embodiments described herein provide a method and system for integrated per customer contextual pattern detection for RPs and the customers enabling transparency and early detection of attacks and leakage of secure information.

As described in further detail below, an LOA Provider 100 such as a mobile device may be used in facilitating a secure login. Embodiments described herein provide methods for remotely or locally providing additional factors digital authorization for a transaction. This allows for verifying who the user entity is, what you know, what you have, who you are, and contextual intelligence based on the established identity framework proving that it is truly the user entity by providing all proof that "It's Me" requesting and approving the transaction.

For illustration purposes, certain embodiments may be discussed in terms of an online service or a computer related service for unlocking an account, without limiting the scope of the embodiments disclosed herein. For example, LOA Provider 100 may be employed for logging into, interacting with, unlocking, authenticating or authorizing any RP Service, such as unlocking a car, transactions, stock and bond exchange, identity proofing, entering a building, identity verification, authorizing an action or a transaction by another person or entity on the LOA Provider user's behalf, etc. In some embodiments, multiple devices may be provisioned and capable of authorizing a certain action. Certain other functions, such as approval by board members in a corporation, multiple approval for SAP®, approval by any (or all) members of a family, voting techniques may all fall within the scope of the embodiments disclosed herein, without limiting the scope in any manner.

Referring again to FIG. 1A, LOA Provider 100 is used to generate on-demand authorization for LOA N and LOA N+1 via LOA Server 400. The backend RP Server 10 may provide a number of different account RP Services, capabilities and information associated with an account or a user entity. In one embodiment, the RP Server 10 may be owned or operated by a financial institution or any other entity that maintains user sensitive data. RP Services Application 300 of FIG. 1A shows various RP Services. Each RP Service may be associated with a different LOA of the identity of the user entity (or machine) accessing the RP Service. For example, viewing the account balance has the lowest LOA associated with it (i.e., LOA N). Therefore the account balance may be accessible as soon as the user entity at Client Device 200 enters the login ID and password and the information is verified by the RP Server 10 at which point the request to authorize the transaction is sent to the LOA Provider 100 by the LOA Server 400. At this point the LOA Provider 100 (e.g., phone, smart watch, wearable wireless device, smart tattoo or other) as the registered multifactor authentication and LOA Provider 100 associated with the user entity registered on the RP confirms (or declines) the transaction authorizing access to the account balance information. In contrast, other functions that may require higher levels of assurance will demand consecutive out of band authorizations. For example, referring to FIG. 1B, changing contact information (LOA N+1), making a payment (LOA N+2) or changing the password (LOA N+3) may require higher levels of assurance associated with the user entity identity which will go through the sequence of on-demand notification and authorization via LOA Provider 100 as the registered multifactor authentication and LOA Provider device.

A detailed sequence of events by which the LOA Provider 100 may be used to generate LOA N and LOA N+1 via LOA Server 400 is illustrated by FIG. 1A and includes the following:

User entity at Client Device 200 initiates a login request that requires a specific LOA N to RP Services Application 300 by providing the user entity Login-ID and Password to create an Active Session.

RP Services Application 300 approves login and grants access to "Account Balance" information with required LOA N and sends a request to LOA Server 400 with transaction specific metadata through a secure connection.

The LOA Server 400 after verifying the RP Service Application 300 and the requested authenticity will then identify the target LOA Provider 100 which has been provisioned as the LOA N Provider (by the user entity, RP Services Application 300, and LOA Server 400).

LOA Provider (e.g., mobile device) 100 sends the LOA N response with required metadata (e.g., approve or decline) embedded with required multifactor credentials that the LOA Provider 100 and the user entity are demanded to provide such as such as finger print(s) (given that change of address and email are critical because now all notifications will go to different home address, phone or email).

The LOA Server 400 sends the response and associated data to RP Services Application 300.

RP Services Application 300 grants access to user entity at client device 200 for LOA N, allowing all LOA N services such as account balance.

User entity then requests a new level of service needing a LOA N+1 (e.g., "Change Account Info") which requires an on-demand LOA authorization using LOA Provider 100 to provide multifactor authentication.

RP Services Application 300 to approve "Change Account Info" access with required LoA N+1 sends a request to LOA Server 400 with transaction specific metadata through a secure connection.

The LOA Service 400 after verifying the RP Services Application 300 and the request authenticity will identify the target LOA Provider 100 which has been provisioned as the LoA N+1 provider (by user entity, RP Services Application 300, and LOA Server 400).

LOA Provider 100 sends the requested LOA N+1 response with required metadata (e.g., approve or decline) embedded with required multifactor credentials that the LOA Provider 100 and user entity are demanded to provide.

The LOA Server 400 sends the response and associated data to RP Services Application 300.

RP Services Application 300 grants access to the user entity at client device 200 for LOA N+1 allowing all LOA N+1 services such as "Change Account Info".

Figure 8:
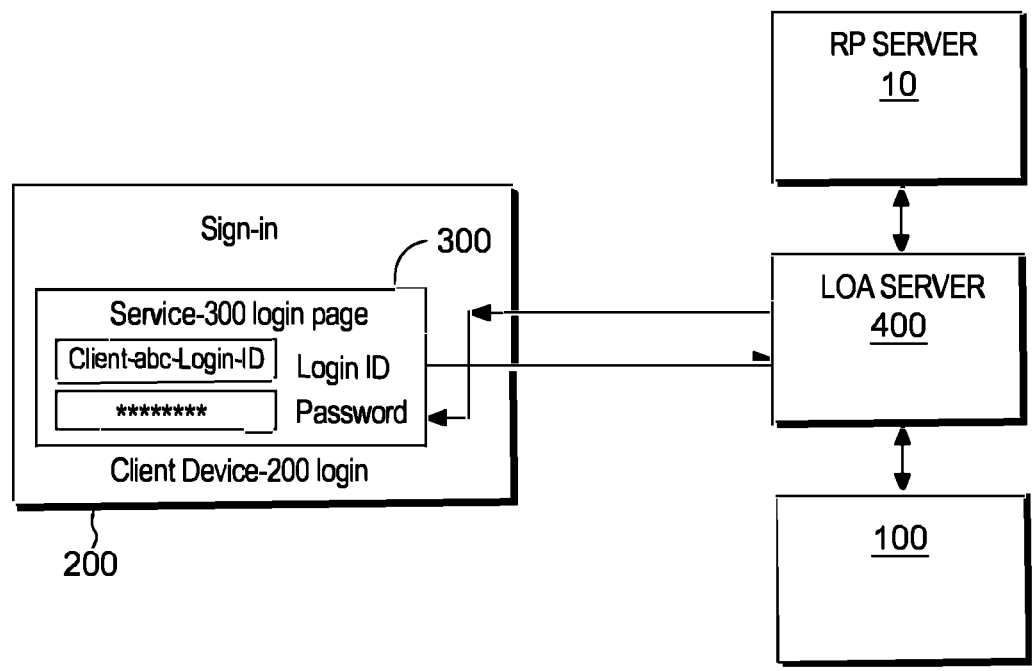
FIG. 8 shows Dynamic On Demand Authentication and Authorization as a function of LOA with LOA N using a server agent and out of band device.

FIG. 8 illustrates dynamic on demand authentication and authorization as a function of LOA with LOA N using LOA Provider 100 to generate on-demand authorization for LOA N via LOA Server 400. The embodiment of FIG. 8 allows for securely logging into a RP Service requesting access for signing on with a particular Level of Assurance N (LOA N). A user entity via Client Device 200 uploads an RP Services Application for the RP through a webpage, application, or any other appropriate manner and the user entity enters the authenticating login ID and password. As shown in FIG. 8, the LOA N service 400 may be redirected to a registered LOA Provider 100 to provide contextual information (e.g., biometric and Contextual Identifiers) deemed necessary to authorize the transaction as a part of a multifactor authentication method. For implementing this exemplary method, steps are as follows:

Client device 200 provides a user entity an interface for Sign-In for the online service.

Sign-in proceeds by providing the correct Login-ID and password which will be verified by the RP Server 10 of RP Services Application 300.

Upon completion of the user entity sign-in verification of Login-ID and password, RP Services Application 300 sends a request for out of band authorization of the requested LOA N transaction to LOA Server 400 as the LOA service.

The request for authorization for transaction with the LOA N is sent to the registered LOA Provider 100.

LOA Provider 100 grants authorization to LOA Server 400.

Figure 9:
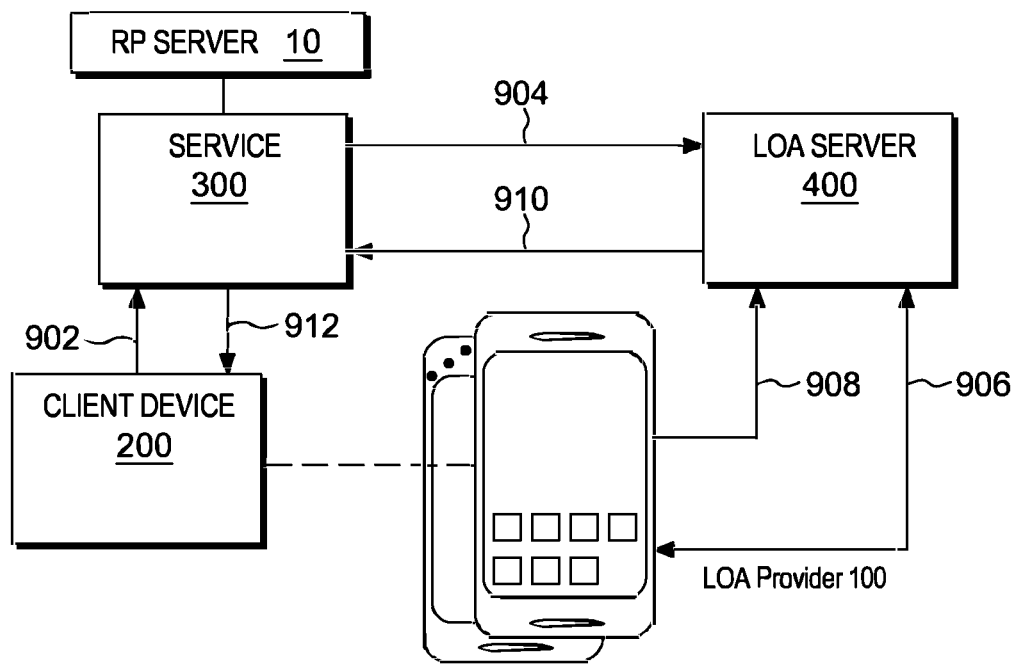
FIG. 9 shows an out of band (e.g., LOA Provider as a mobile device) registration.

FIG. 9 illustrates a registration method for registering an LOA Provider (e.g., mobile device) 100. In this embodiment, the user entity selects to opt in for a secure multifactor authentication using LOA for one or more online RP Services 300. Exemplary steps are provided as follows:

In step 902, Client Device 200 provides the user entity online RP Services Application 300 and allows the user to select the option for secure multifactor authentication and LOA using the LOA Provider 100 for multifactor LOA authentication. The RP Services Application 200 may be provided as a native application, an application running as a cloud service, a web browser interface or another suitable interface.

In step 904, online RP Services Application 300 enables verification of user entity credentials and sends a request to LOA Server 400 requesting the LOA Server to register and provision the LOA Provider 100 for the user entity using a suitable method of authorization. The method of authorization can be an open standard for authorization such as OAuth, OAuth 2.0, Secure Remote Password or other suitable secure authorization techniques.

In step 906, the LOA Server 400 initiates device registration for targeted secure multifactor authentication LOA Provider 100. The binding between LOA Provider 100 and LOA Server 400 takes place by LOA Server's 400 knowledge of the LOA Provider 100 unique ID (e.g., a unique user identification, a unique identity of the person and for a mobile device it could be its International Mobile Equipment Identity (IMEI) and/or other uniquely provisioned identifications) as a method of authenticating/authorization. This enables binding of the LOA Provider 100 to the user entity and RP Services Application 300. The LOA Server 400 uses the LOA Provider's unique ID and generates a unique pair of private-public keys. A signed operating system for virtual machines (OSV) application for LOA Provider 100 may be installed by LOA Provider 100 for accepting registration from LOA Server 400. In alternative embodiments there could be a plurality of LOA Providers 100 capable of providing authenticating/authorization services.

In step 908, LOA Provider 100 unique identity (e.g., IMEI and/or other unique ID) is used in LOA Server 400 to establish a unique registration.

In step 910, LOA Server 400 informs online RP Services Application 300 the completion of device 100 registration for user entity.

In step 912, online RP Services Application 300 confirms to client device 200/user entity the completion of the LOA Provider 100 registration process. LOA Provider 100 is now ready to be used as a means for secure multifactor login authentication.

Figure 10:
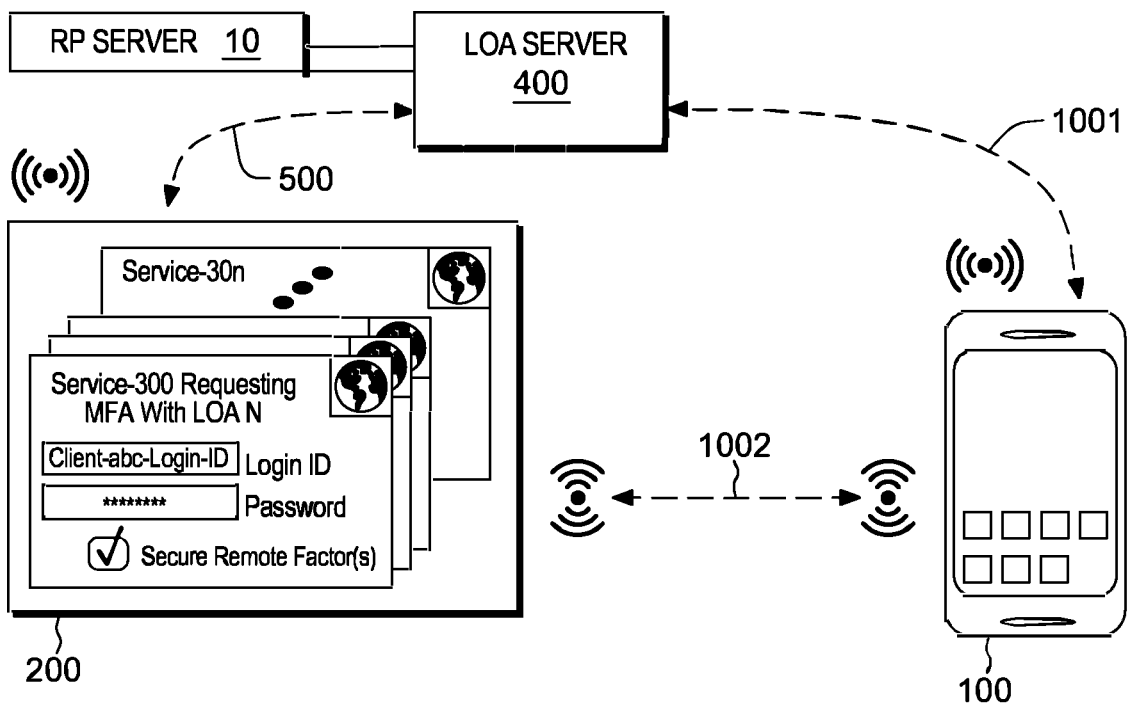
FIG. 10 illustrates a Dynamic On Demand Authentication and Authorization as a function of LOA N using an LOA Provider (e.g., a mobile device).

FIG. 10 illustrates a dynamic on demand multifactor authentication and authorization as a function of LOA N using a LOA Provider 100. The steps discussed below demonstrate secure signing into a service with a specific LOA N requirement. The authorization is done through the assistance of an out of band service and specific provisioned device (i.e., LOA Provider 100) as described as follows:

The LOA Provider 100 provides a secure remote real time transaction authorization compliant to the predefined requirement(s) of the LOA N.

The user entity logs in at Client Device 200 to the online RP Services Application 300 where secure multifactor authorization based on dynamic LOA is enabled and enforced by the online RP Services Application 300.

A secure channel between the RP Services Application 300 to the LOA Server 400 is established. The transaction and LOA N is then presented to the LOA provider 100. The LOA Provider 100 generates a multifactor authentication meeting the LOA N requirements.

Relying on the LOA Server 400 and LOA Provider 100, an on demand authorization is presented back to RP Services Application 300, not only elevating the trust in the transaction authorization but may also be advantageous in eliminating the need for the user entity to memorize a big roster of passwords and instructions for different LOA tiers of transactions. The communication between online RP Services Application 300 and LOA Server 400 as well as the communication between LOA Server 400 and the secure multifactor authentication LOA Provider 100 are secured through a set of secure communication protocols service.

The following steps describe the flow of request and delivery of secure multifactor authorization based on LOA N:

Sign-In to online RP Services Application 300 at client device 200 with a secure multifactor policy.

Online RP Services Application 300 authenticates user entity and request for secure multifactor authorization for the user entity from the LOA Provider 100 on the LOA Server 400 by submitting a payload through a secure channel using real time transaction authorization network 501.

The LOA Server 400 sends an authorization referred as a remote real time transaction authorization request through a secure channel for the online RP Service to the LOA Provider 100 using local proximity wireless network 1002.

The LOA Provider 100 authorization payload including the associated with LOA N is then sent to the LOA Server 400 through a secure channel using network 1001 or local proximity network 1002.

The LOA Provider 100 upon receiving a request from LOA Server 400 prompts the user entity for approval of the transaction by authorizing the transaction and generating the key for LOA Server 400 to be delivered to the RP Server 10 through network 1001 and network 500 or through using a device2device proximity network 1002 (e.g., Bluetooth®).

The LOA Server 400 sends the payload including the real time transaction authorization from LOA Provider 100 for the user entity to online RP Services Application 300 approving the transaction that required LOA N. In one embodiment, the secure multifactor itself can be the password for logging into the online RP Services Application 300.

Note that various policies can be applied to request for additional secure multifactor authorization. For example, even within the login session a transaction or transfer of data, funds or any other measure can trigger a secure multifactor authorization of higher LOA.

Figure 11:
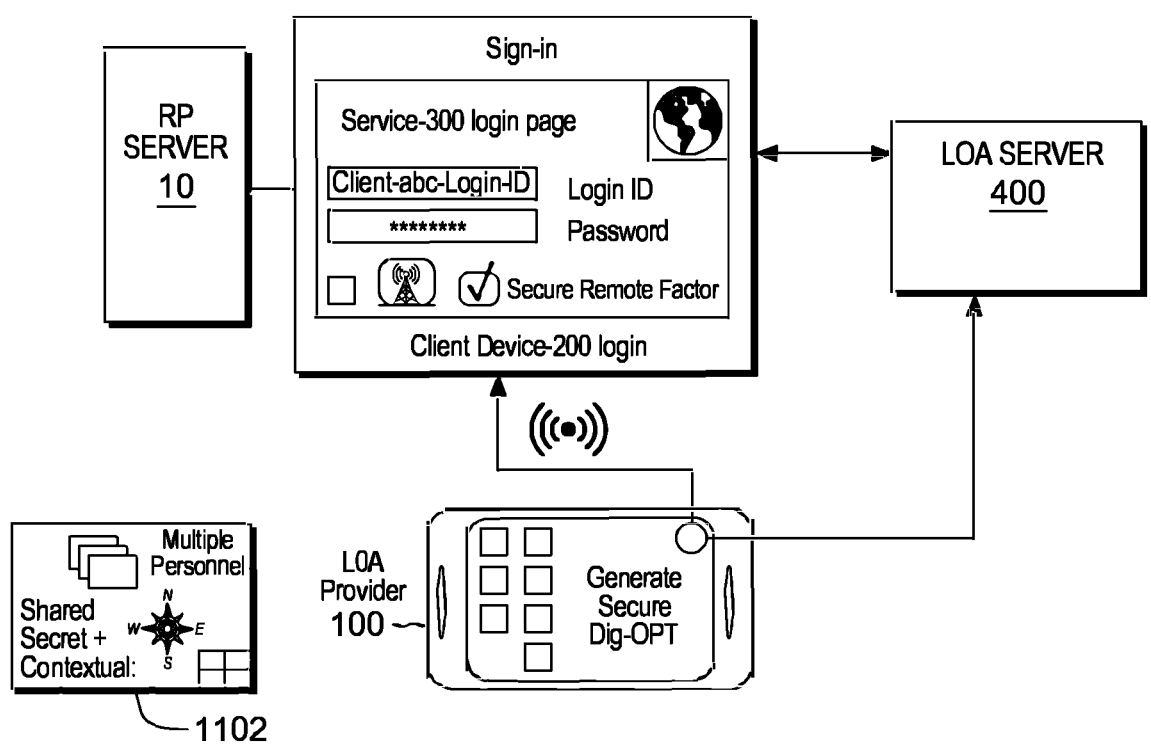
FIG. 11 illustrates a variable authentication with LOA N+1 requesting and granting new authorization.

FIG. 11 illustrates a method and system for multifactor authentication according to yet another embodiment requiring additional Contextual Identifiers that LOA Provider 100 needs to acquire and deliver as part of the authentication and authorization. FIG. 11 may use steps similar to those described in FIG. 10 with some variations. LOA Provider 100 may additionally use a shared secret (1102) or real-time shared secret generator between the LOA Provider 100 and the online RP Services Application 300 and/or the LOA Server 400 in allowing the user entity to authorize a transaction in realtime if required. Furthermore, the LOA Provider 100 may also use user Contextual Identifiers before allowing the user to authorize a transaction. For example, the LOA Provider 100 may identify the user using unique user characteristics and/or biometrics, such as voice, fingerprints, retinal scan, usage patterns, gesture, and the like at step 4 of the method for FIG. 10 before allowing the user entity to complete the authorization of the transaction. The LOA Provider 100 may also use other Contextual Identifiers, such as location of the device, the proximity of the device, time of the day, etc. in allowing the authorization of the transaction as part of the LOA N. For example, if the user is in North America and the authorization is for a transaction that had occurred around the same time of day in Southeast Asia, the user entity may not be authorized to continue with the transaction without further authorization/authentication steps (i.e., a higher level of the LOA such as realtime authorization and fingerprint as an example). In some embodiments, multiple users may be required to authorize the transaction using the same device or multiple different devices as a function of LOA required. For example for authorization of modification, viewing or forwarding of a top secret document not only a higher LOA may be needed, additional Contextual Identifiers and even additional individuals as the LOA Providers may be required (all on the same LOA Provider 100 or on a plurality of LOA Provider devices).

Figure 12:
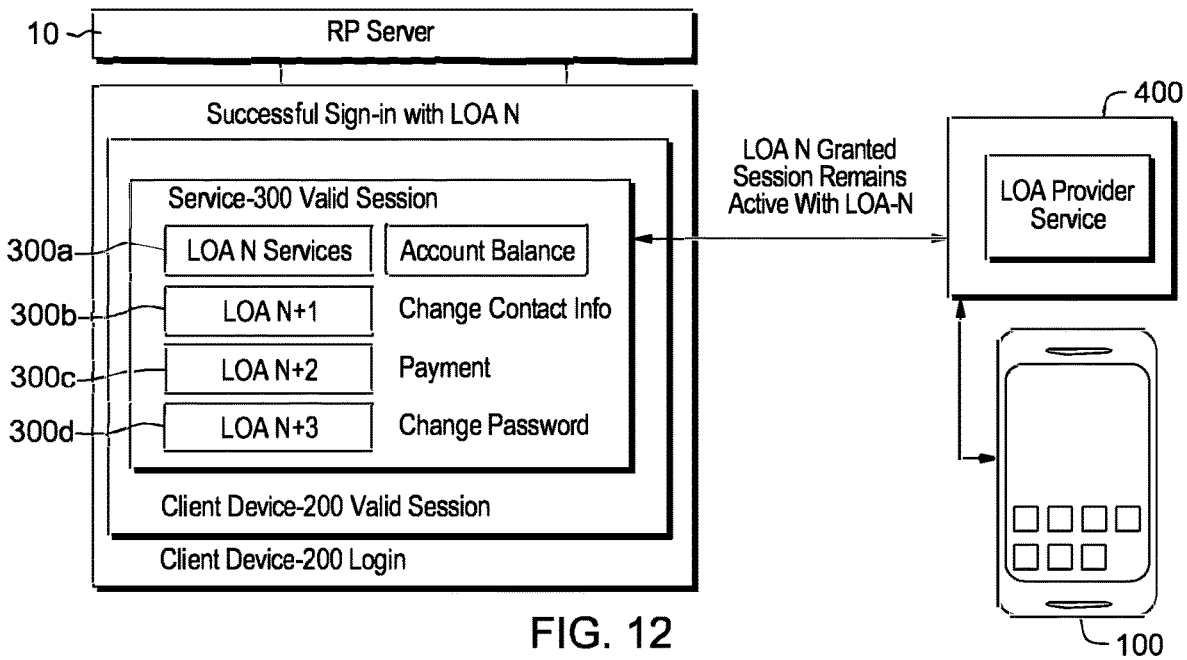
FIG. 12 shows a variable authentication with LOA N granted session with LOAN active.

FIG. 12 illustrates access for LOA N which has been granted enabling services with LOA N (e.g., Account Balance Services). FIG. 12 shows user entity at Client Device 200 already having access to RP Service 300 and all services with the Level Of Assurance N (LOA N). In FIG. 12, the top block marked with "LOA N Services" 300a illustrates the establishment of a valid session for the RP Service 300 with LOA N and associated access privileges such as Account Balance as an example. In one embodiment, an RP Server 10 enables loading of the user interface for the user entity login and password changes which requires a step-up (or elevated) LOA. The lower blocks in FIG. 12, designated as LOA N+1–3 (300b-300d), illustrate the different levels of services associated with the RP's policy of different LOA requirements. Each service may be further associated with a particular LOA and specific contextual requirements for multifactor authentication, wherein gaining authentication for a particular LOA, may automatically provide the user with access to the services available from the Service 300 at that level and lower LOAs. While FIG. 12 illustrates that the user entity has been granted access to LOA N with the help of mobile device 100 as the LOA Provider 400, such as viewing account balance as an example, in one implementation, the user may have access to the LOA N until the user logs out, a timer has expired or a request for a higher LOA is submitted.

Figure 13:
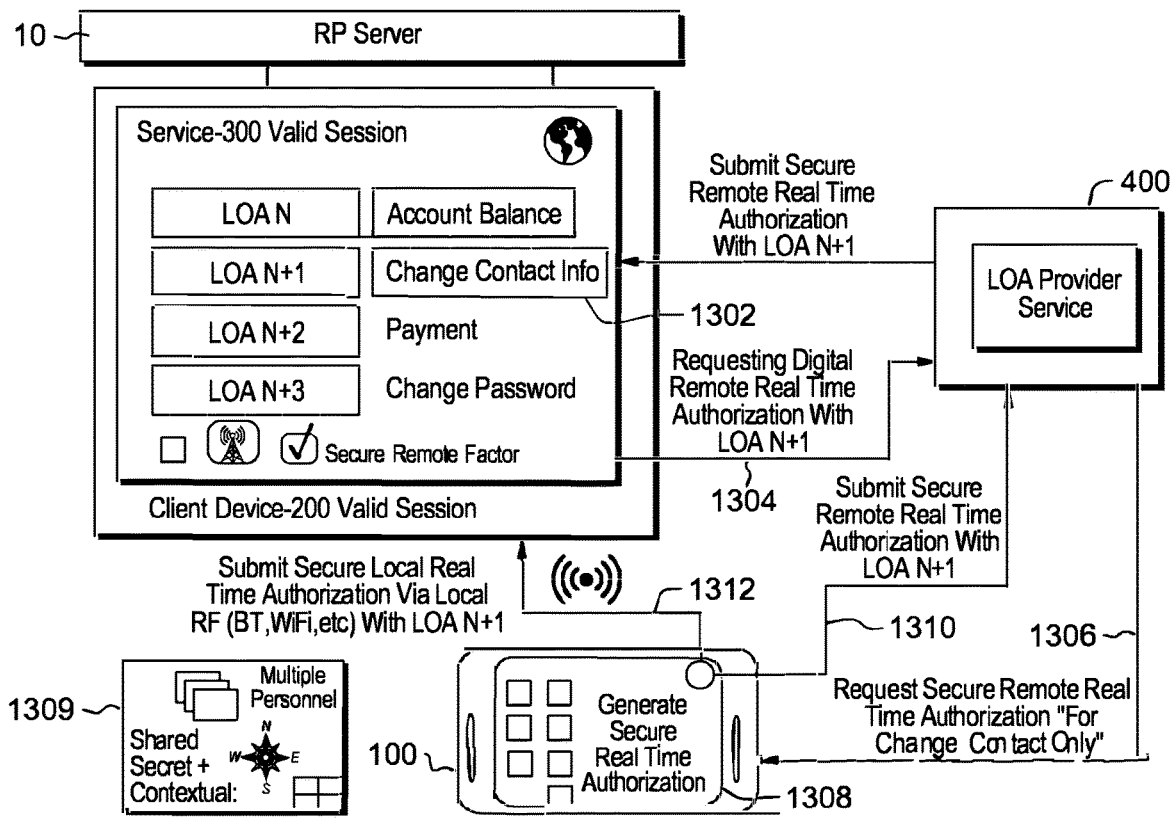
FIG. 13 shows a variable authentication with LOA N+1 requesting new authorization.

FIG. 13 shows a variable authentication with LOA N requesting LOA N+1 using mobile device 100 plus Contextual Identifiers. FIG. 13 illustrates user entity at client device 200 using dynamic on demand authentication and authorization requesting an RP Service with a LOA N+1 while already at a lower level of assurance, LOA N. The sequence is as follows:

the user entity in step 1302, has logged into the system at LOA N and then requested elevation of the LOA to LOA N+1 to have access to change contact information services and any other LOA N+1 or lower;

the user entity in step 1304 at the Client Device 200 requests real time transaction authorization with LOA N+1;

LOA Server in step 1306 requests secure real time transaction authorization "For Change Contact Info" from Local Provider 100;

in step 1308, LOA Provider 100 generates secure real time transaction authorization using shared secret plus Contextual Identifiers 1309;

in step 1310, secure real time transaction authorization is sent from the Local Provider 100 to the LOA Server and at approximately the same time in step 1312 the secure real time transaction authorization is sent via wireless (e.g., Bluetooth, WiFi, etc.) with LOA N+1 to Client Device 200.

Figure 14:
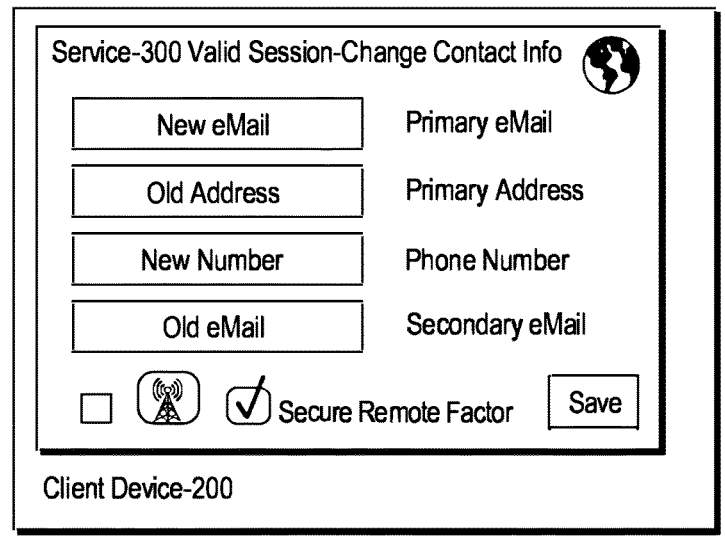
FIG. 14 shows a Client Device completing an LOA N+1 Transaction.

FIG. 14 shows user entity at client device 200 was granted authorization for a LOA N+1 transaction using a mobile device 100 and additional Contextual Identifiers required for verification and authorization of the transaction. At LOA N+1, the RP may allow access to Services associated with LOA N and LOA N+1, for example, designators such as Account Balance and Change Contact Information are both allowed. In one embodiment, the LOA N+1 session may remain active for the duration of the LOA N+1 transaction, a predetermined time of period, or may expire upon a predetermined time of inactivity or completion of the LOA N+1 transaction. In FIG. 14, the user entity at client device 200 is completing a LOA N+1 transaction after which the RP may denigrate the session back to LOA N. For example, once the session is elevated to a LOA N+1 by authorization of mobile device 100 and required Contextual Identifiers, the RP Server 10 may allow the user to update a number fields, such as 1) adding new email address, 2) editing or keeping old address, 3) adding new number, and 4) keeping old email. Once the user 5) saves the information, the session may exit out of change of contact. Furthermore, in one embodiment, once the user exits out of change of contact, the user entities LOA may be denigrated back to the LOA N.

Figure 15:
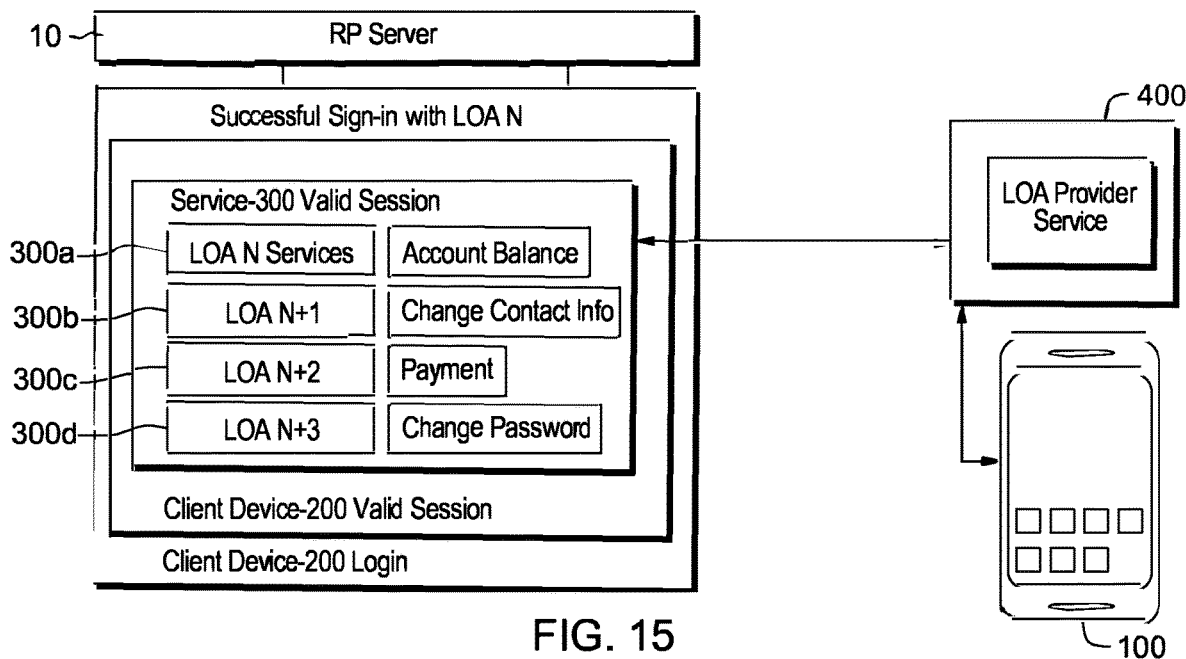
FIG. 15 shows a session resuming back to LOA N upon completing the LOA N+1 transaction.

FIG. 15 illustrates the session resuming back to LOA N upon completing the LOA N+1 transaction. In FIG. 15, field 300a indicates the level of access allowed, while fields 300b, 300c, and 300d indicate the levels of access not allowed at any given stage of the active session. While in a valid session (neither expired nor logged out) the user entity can select any of the RP Services depending on the LOA number that the LOA Provider (e.g., user entity and mobile device 100 combined) can provide LOA N+X assurance to enable use of desired services.

In addition to the methods discussed above, the authorization and verification for a user may be used in authenticating or authorizing an identity with respect to a social network account such as a Facebook® and/or Google+®. For example, certain applications/services may allow the user to use their social network account to perform operations online. In such a scenario the dynamic on-demand LOA can be provided as an integrated or an over the top service using dynamic authorization with adaptive levels of assurance.

In addition to the methods discussed above, the authorization and verification for a user may be used in authenticating or authorizing an identity with respect to a social network account such as a Facebook® and/or Google+®. For example, certain applications/services may allow the user to use their social network account to perform operations online. In such a scenario the dynamic on-demand LOA can be provided as an integrated or an over the top service using dynamic authorization with adaptive levels of assurance.

Figure 16:
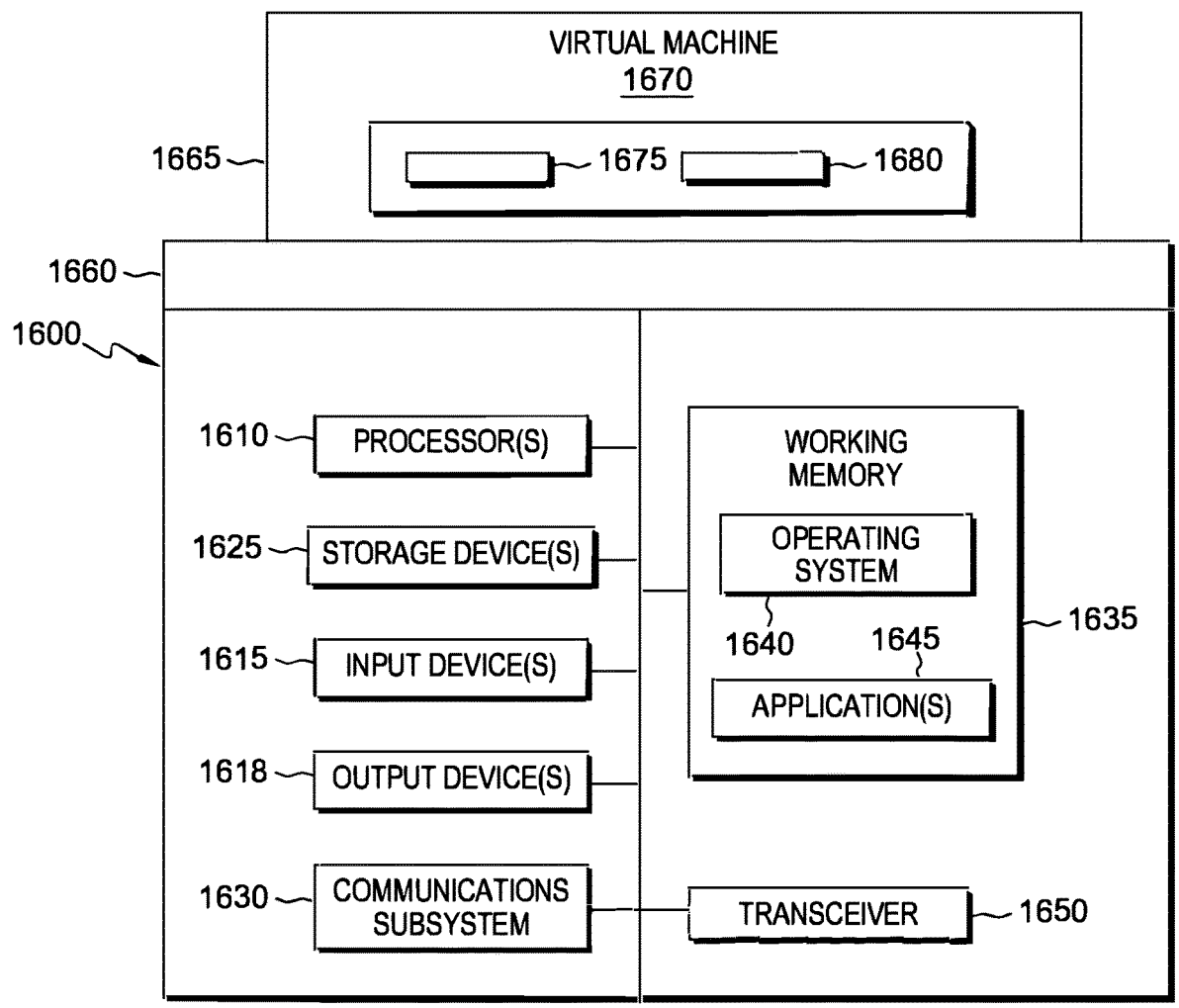
FIG. 16 provides a schematic illustration of one embodiment of a computing system or device 1600 that can perform the system and methods provided by various embodiments of this disclosure.

FIG. 16 illustrates an example computing device or hardware platform incorporating parts or all of the devices employed in practicing the embodiments described above. The computing device as illustrated in FIG. 16 may be incorporated as part of any computerized system disclosed herein. For example, the computing device can represent some or all of the components of a LOA Provider 100, Client Device 200, LOA Server 400 and RP Server 10 described in FIGS. 1A-15. The computing device may be any computing system 1600 with one or more input sensory unit or input devices 1615 such as sensors 1650 and one or more input/output devices such as a display unit or a touch screen. Examples of a computing device 1600 include, but are not limited to, servers, PC computers, mainframes, video game consoles, tablets, smart phones, laptops, netbooks, wearables or other portable devices. FIG. 16 is meant only to provide a generalized illustration of various components, any or all of which may be utilized as appropriate. FIG. 16, therefore, broadly illustrates how individual system elements may be implemented in a relatively separated or relatively more integrated manner.

The computing device 1600 is shown comprising hardware elements that can be electrically coupled via a bus 1605 (or may otherwise be in communication, as appropriate). The hardware elements may include one or more processors 1610, including without limitation one or more general-purpose processors and/or one or more special-purpose processors (such as digital signal processing chips, graphics acceleration processors, and/or the like); one or more input devices 1615, which can include without limitation a camera, sensors (including photo/light detectors), a mouse, a keyboard and/or the like; and one or more output devices 1618, which can include without limitation a display unit, a printer and/or the like. Output devices may be connected to a transceiver 1650 for connection to a network and the like.

The computing device 1600 may further include (and/or be in communication with) one or more non-transitory storage devices 1625, which can comprise, without limitation, local and/or network accessible storage, and/or can include, without limitation, a disk drive, a drive array, an optical storage device, a solid-form storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computing device 1600 might also include a communications subsystem 1630, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 1630 may permit data to be exchanged with a network (such as the network described below, to name one example), other computing devices, and/or any other devices described herein. In many embodiments, the computing device 1600 will further comprise a non-transitory working memory 1635, which can include a RAM or ROM device, as described above.

The computing device 1600 can comprise software elements, shown as being currently located within the working memory 1635, including an operating system 1640, device drivers, executable libraries, and/or other code, such as one or more application programs 1645, which may comprise computer programs provided by various embodiments, and/or may be designed to implement methods, and/or configure systems, provided by other embodiments, as described herein. In one implementation, components or modules of the figures may be performed using such software elements. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1625 described above. In some cases, the storage medium might be incorporated within a computing device, such as computing device 1600. In other embodiments, the storage medium might be separate from a computing device (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computing device 1600 and/or might take the form of source and/or installable code, which, upon compilation and/or installation on the computing device 1600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 1600 such as network input/output devices may be employed.

Some embodiments may employ a computing device (such as the computing device 1600) to perform methods in accordance with the disclosure. For example, some or all of the procedures of the described methods may be performed by the computing device 1600 in response to processor 1610 executing one or more sequences of one or more instructions (which might be incorporated into the operating system 1640 and/or other code, such as an application program 1645) contained in the working memory 1635. Such instructions may be read into the working memory 1635 from another computer-readable medium, such as one or more of the storage device(s) 1625. Merely by way of example, execution of the sequences of instructions contained in the working memory 1635 might cause the processor(s) 1610 to perform one or more procedures of the methods described herein.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional Steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of Steps may be undertaken before, during, or after the above elements are considered. Accordingly, the above description does not limit the scope of the disclosure.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be feature of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

The invention claimed is:

1. A method for authorizing a Client Device requested access, the method comprising:
   forming a proximity enforced Bluetooth binded communication link between the Client Device and a Level of Assurance (LOA) Provider;
   providing a screen to a user entity at the Client Device from a Relying Party Services;
   receiving authentication information from the user entity;
   obtaining identity of the user entity on the LOA Provider using contextual and behavioral information of the user entity;
   performing during an active session an out of band authentication over secure communication channels using a secure communication protocol by sending the contextual and behavioral information and challenge and response information to an LOA Server from the LOA Provider to determine the level of assurance;
   identifying the user entity at the LOA Server using the contextual and behavioral information and challenge and response information to determine whether to authorize access to the Relying Party Services; and
   granting by the LOA Server an authentication token which can be validated.

2. The method of claim 1, wherein the contextual information includes biometric information.

3. The method of claim 2, wherein the biometric information is one of the group consisting of: facial, voice, fingerprint, and retinal scan.

4. The method of claim 1, wherein the contextual identifiers include location of the LOA Provider and the Client Device.

5. The method of claim 1 further comprising:
   sending from the LOA Provider to the LOA Server a unique LOA Provider device identification to be used to identify the LOA Provider.

6. The method of claim 1 further comprising:
   sending from the LOA Provider to the LOA Server a real-time shared secret to be used to identify the user entity.

7. The method of claim 1 further comprising:
   locking and unlocking the Client Device using the Bluetooth binded communication link.

8. The method of claim 1, wherein required authorization credentials by the LOA Server depends on a risk assessment.

9. The method of claim 1, further comprising:
   stepping up or down the LOA at the LOA Server based on contextual and behavioral location change of the LOA Provider device.

10. The method of claim 1, further comprising:
    stepping up or down the LOA at the LOA Server based on a transaction LOA demand.

11. The method of claim 1, wherein the Relying Party Services includes a login to a web application, a workstation, a remote desktop, or access to a physical access control to a secure space.

12. The method of claim 1, wherein the authentication token can be a multi-factor authentication including at least one of the group consisting of: Bluetooth Low Energy proximity, Near Field Communications, and biometric.

13. The method of claim 9, wherein the stepping up or down requires additional challenge and response mechanisms including personal identification number (PIN), biometric, and password.

14. An authentication system having a plurality of processors and a plurality of non-transitory computer-readable storage mediums including a plurality of computer-executable instructions executed by the plurality of processors to perform operations comprising:
    forming a proximity enforced Bluetooth communication link between the Client Device and a Level of Assurance (LOA) Provider;
    providing a screen to a user entity at the Client Device from a Relying Party Services;
    receiving authentication information from the user entity;

obtaining identity of the user entity on the LOA Provider using contextual and behavioral information of the user entity;

performing during an active session an out of band authentication over secure communication channels using a secure communication protocol by sending the contextual and behavioral information and challenge and response information to an LOA Server from the LOA Provider to determine the level of assurance;

identifying the user entity at the LOA Server using the contextual and behavioral information and challenge and response information to determine whether to authorize access to the Relying Party Services; and granting by the LOA Server an authentication token which can be validated.

15. The system of claim 14, wherein the contextual information includes biometric information from the group consisting of: facial, voice, fingerprint, and retinal scan.

16. The system of claim 14, wherein the contextual identifiers include location of the LOA Provider and the Client Device.

17. The system of claim 14 further comprising:
sending from the LOA Provider to the LOA Server a unique LOA Provider device identification to be used to identify the LOA Provider.

18. The system of claim 14 further comprising:
sending from the LOA Provider to the LOA Server a real-time shared secret to be used to identify the user entity.

19. The system of claim 14 further comprising:
locking and unlocking the Client Device using the Bluetooth communication link.

20. The system of claim 14, further comprising:
stepping up or down the LOA at the LOA Server based on contextual and behavioral location change of the LOA Provider device.

* * * * *